United States Patent
Wang et al.

(10) Patent No.: US 11,765,370 B2
(45) Date of Patent: Sep. 19, 2023

(54) VIDEO RESIDUAL DECODING APPARATUS USING NEIGHBOR STORAGE DEVICE WITH SMALLER STORAGE SIZE TO STORE NEIGHBOR DATA FOR CONTEXT SELECTION AND ASSOCIATED METHOD

(71) Applicant: MEDIATEK INC., Hsin-Chu (TW)

(72) Inventors: Sheng-Jen Wang, Hsinchu (TW); Ming-Long Wu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/553,819

(22) Filed: Dec. 17, 2021

(65) Prior Publication Data
US 2023/0034698 A1     Feb. 2, 2023

Related U.S. Application Data

(60) Provisional application No. 63/225,972, filed on Jul. 27, 2021.

(51) Int. Cl.
| | | |
|---|---|---|
| H04N 11/02 | (2006.01) | |
| H04N 19/44 | (2014.01) | |
| H04N 19/176 | (2014.01) | |
| H04N 19/119 | (2014.01) | |
| H04N 19/105 | (2014.01) | |

(52) U.S. Cl.
CPC ........... *H04N 19/44* (2014.11); *H04N 19/105* (2014.11); *H04N 19/119* (2014.11); *H04N 19/176* (2014.11)

(58) Field of Classification Search
CPC ....................................................... H04N 19/44
USPC ......................................... 375/240.01–240.29
See application file for complete search history.

(56) References Cited

U.S. PATENT DOCUMENTS

| | | | |
|---|---|---|---|
| 10,574,993 B2 * | 2/2020 | Zhang | H04N 19/625 |
| 2010/0208820 A1 * | 8/2010 | Huang | H04N 19/56 |
| | | | 375/E7.076 |
| 2012/0328026 A1 * | 12/2012 | Sole Rojals | H04N 19/13 |
| | | | 375/240.18 |
| 2013/0051475 A1 * | 2/2013 | Joshi | H04N 19/436 |
| | | | 375/240.18 |

FOREIGN PATENT DOCUMENTS

| | | |
|---|---|---|
| CN | 111758254 A | 10/2020 |
| TW | 202107890 A | 2/2021 |

* cited by examiner

*Primary Examiner* — Leron Beck
(74) *Attorney, Agent, or Firm* — Winston Hsu

(57) ABSTRACT

A video residual decoding apparatus includes a residual decoding circuit and a neighbor storage device. The residual decoding circuit applies residual decoding to a transform block, wherein the transform block is divided into M sub-blocks, M is a positive integer, and the M sub-blocks are processed by the residual decoding in a diagonal scan order. The neighbor storage device stores neighbor data that belong to neighboring sub-blocks and are referenced by the residual decoding of a current sub-block, wherein neighbor data belonging to a sub-block is derived from a residual decoding result of the sub-block, and a storage size of the neighbor storage device is not larger than a maximum data amount of neighbor data derived from residual decoding results of N sub-blocks, where N is a positive integer, and N is smaller than M.

20 Claims, 22 Drawing Sheets

|   | 0 | 1 | 2 | 3 | 4 | 5 | 6 | 7 |
|---|---|---|---|---|---|---|---|---|
| 0 | SB(0,0) | SB(1,0) | | | | | D | D+1 |
| 1 | SB(0,1) | SB(1,1) | | | | | D+1 | D+2 |
| 2 | | | | | | D+1 | D+2 | |
| 3 | | | | | D+1 | D+2 | | |
| 4 | | | | D+1 | D+2 | | | |
| 5 | | | D+1 | D+2 | | | | |
| 6 | | D+1 | D+2 | | | | | |
| 7 | D+1 | D+2 | | | | | | |

FIG. 7

VIDEO RESIDUAL DECODING APPARATUS USING NEIGHBOR STORAGE DEVICE WITH SMALLER STORAGE SIZE TO STORE NEIGHBOR DATA FOR CONTEXT SELECTION AND ASSOCIATED METHOD

CROSS REFERENCE TO RELATED APPLICATIONS

This application claims the benefit of U.S. provisional application No. 63/225,972, filed on Jul. 27, 2021 and incorporated herein by reference.

BACKGROUND

The present invention relates to a video decoder design, and more particularly, to a video residual decoding apparatus using a neighbor storage device with a smaller storage size to store neighbor data for context selection and an associated method.

The Versatile Video Coding (VVC) standard (also known as H.266 standard) is the most recent video coding standard. The primary objective of the new VVC standard is to provide a significant increase in compression capability compared to its predecessor, the High Efficiency Video Coding (HEVC) standard (also known as H.265 standard). At the same time, VVC includes design features that make it suitable for a broad range of video applications. Like the HEVC standard, the VVC standard also employs context-adaptive binary arithmetic coding (CABAC) technique for entropy encoding residual syntax elements for coefficients in one transform block. Hence, when residual decoding of a current coefficient is being performed at a decoder side, neighbor data derived from residual decoding results of neighboring coefficients may be used for context selection. In a conventional VVC decoder design, a neighbor storage device with a large size is implemented to buffer neighbor data derived from residual decoding results of all coefficients in one transform block. Specifically, assuming that the maximum data amount of neighbor data belonging to one coefficient is A and the number of coefficients included in one TB is B, the conventional neighbor storage device is configured to have B storage units, each having a storage size of A.

Thus, there is a need for an innovative neighbor storage mechanism which enables a neighbor storage device with a smaller size in video residual decoding.

SUMMARY

One of the objectives of the claimed invention is to provide a video residual decoding apparatus using a neighbor storage device with a smaller storage size to store neighbor data for context selection and an associated method.

According to a first aspect of the present invention, an exemplary video residual decoding apparatus is disclosed. The exemplary video residual decoding apparatus includes a residual decoding circuit and a neighbor storage device. The residual decoding circuit is arranged to apply residual decoding to a transform block, wherein the transform block is divided into M sub-blocks, M is a positive integer, and the M sub-blocks are processed by the residual decoding in a diagonal scan order. The neighbor storage device is arranged to store neighbor data that belong to neighboring sub-blocks and are referenced by the residual decoding of a current sub-block, wherein neighbor data belonging to a sub-block is derived from a residual decoding result of the sub-block, and a storage size of the neighbor storage device is not larger than a maximum data amount of neighbor data derived from residual decoding results of N sub-blocks, where N is a positive integer, and N is smaller than M.

According to a second aspect of the present invention, an exemplary video residual decoding method is disclosed. The exemplary video residual decoding method includes: applying residual decoding to a transform block, wherein the transform block is divided into M sub-blocks, M is a positive integer, and the M sub-blocks are processed by the residual decoding in a diagonal scan order; and storing, by a neighbor storage device, neighbor data that belong to neighboring sub-blocks and are referenced by the residual decoding of a current sub-block, wherein neighbor data belonging to a sub-block is derived from a residual decoding result of the sub-block, and a storage size of the neighbor storage device 104 is not larger than a maximum data amount of neighbor data derived from residual decoding results of N sub-blocks, where N is a positive integer, and N is smaller than M.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is a diagram illustrating a case where the neighbor storage device is used to provide neighbor data needed for context selection during regular-mode decoding of one largest transform block.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

In embodiments of the present invention, an entropy decoder of a video decoder (e.g. VVC/H.266 decoder) may perform residual decoding upon a transform block according to a diagonal scan order. In the following, the term "transform block" may denote a block of quantization indexes (also called transform coefficient levels) at different coefficient locations, regardless of whether they are generated by transform and quantization at the encoder side or generated by quantization only at the encoder side. One transform block (TB) may be divided into a plurality of sub-blocks (SBs), and each SB may include a plurality of coefficients. The SB size may be 4×4 or 2×2, depending upon the TB size.

Figure 1:
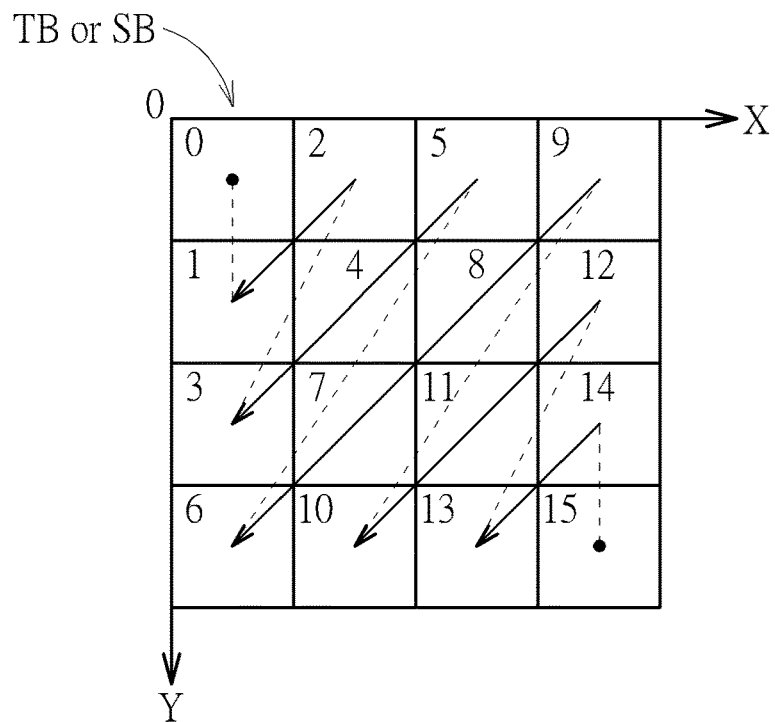
FIG. 1 is a diagram illustrating a reverse diagonal scan order employed by regular-mode residual decoding according to an embodiment of the present invention.

In a case where the residual decoding is performed under a regular mode, a reverse diagonal scan order from right-bottom to left-top may be employed for decoding sub-blocks within one transform block and coefficients within each sub-block of the transform block. FIG. 1 is a diagram illustrating a reverse diagonal scan order employed by regular-mode residual decoding according to an embodiment of the present invention. Suppose that the TB size is 16×16 and the SB size is 4×4. Regarding one transform block, the sub-blocks indexed by 0-15 are decoded in the reverse diagonal scan order (i.e. 15→14→13 . . . → 2→1→0). Regarding each of the sub-blocks within the same transform block, coefficients indexed by 0-15 are also decoded in the reverse diagonal scan order (i.e. 15→14→13 . . . 2→1→0).

Figure 2:
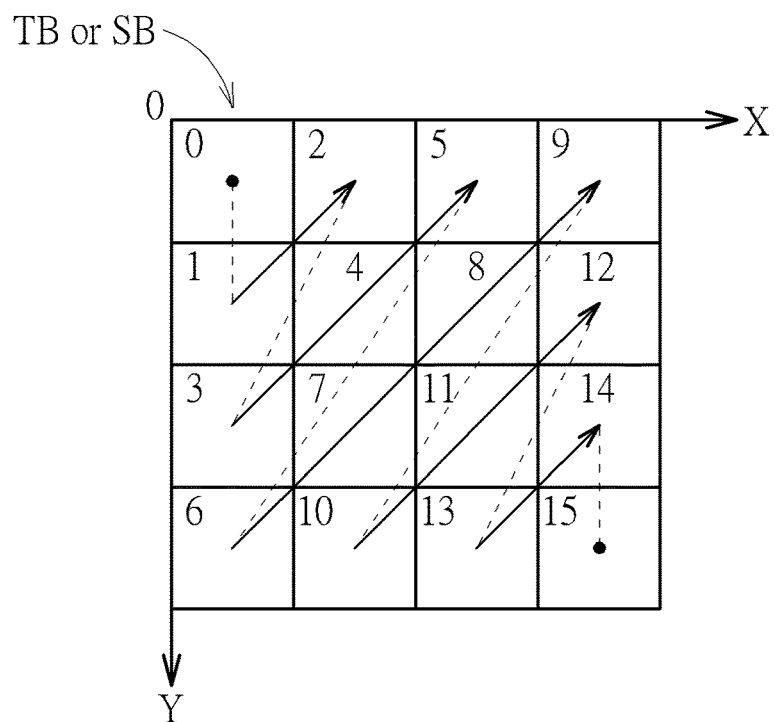
FIG. 2 is a diagram illustrating a forward diagonal scan order employed by transform skip (TS) mode residual decoding according to an embodiment of the present invention.

In another case where the residual coding is performed under a transform skip (TS) mode, a forward diagonal scan order from left-top to right-bottom may be employed for decoding sub-blocks within one transform block and coefficients within each sub-block of the transform block. FIG. 2 is a diagram illustrating a forward diagonal scan order employed by TS-mode residual decoding according to an embodiment of the present invention. Suppose that the TB size is 16×16 and the SB size is 4×4. Regarding one transform block, the SBs indexed by 0-15 are decoded in the forward diagonal scan order (i.e. 0→1→2 . . . → 13→14→15). Regarding each of the sub-blocks within the same transform block, coefficients indexed by 0-15 are also decoded in the forward diagonal scan order (i.e. 0→1→ 2 . . . →13→14→15).

Figure 3:
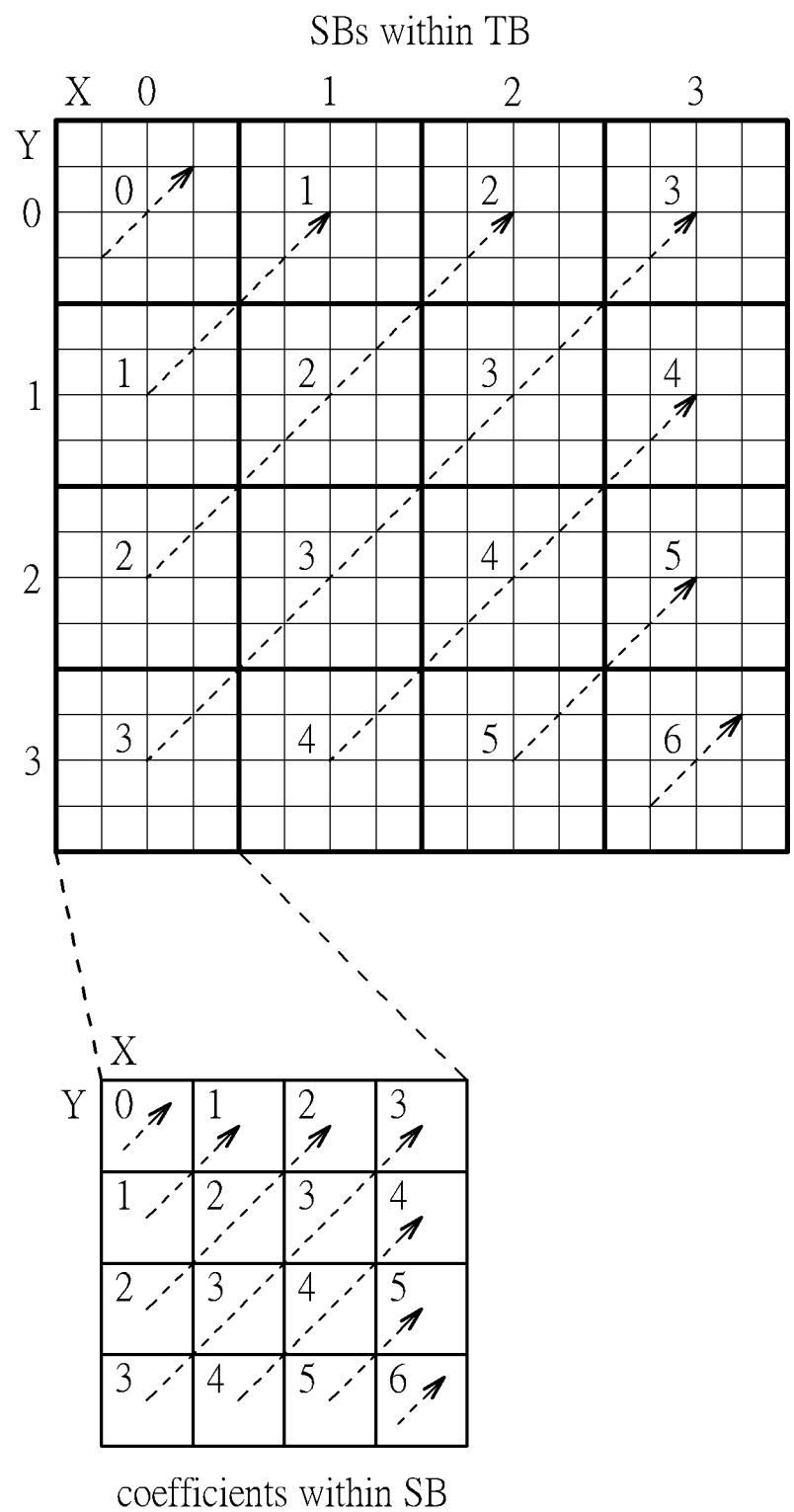
FIG. 3 is a diagram illustrating different diagonal coordinates within one transform block and different diagonal coordinates within one sub-block according to an embodiment of the present invention.

The reverse diagonal scan order may be defined by a descending order of diagonal coordinate D, and the forward diagonal scan order may be defined by an ascending order of diagonal coordinate D. FIG. 3 is a diagram illustrating different diagonal coordinates D={0, 1, 2, 3, 4, 5, 6} within one transform block and different diagonal coordinates D={0, 1, 2, 3, 4, 5, 6} within one sub-block according to an embodiment of the present invention. Suppose that the TB size is 16×16 and the SB size is 4×4. The left-top location (X, Y) is set by (0, 0). Along the X direction, the X coordinate is incremented. Along the Y direction, the Y coordinate is incremented. The diagonal coordinate D is defined by a sum of X and Y. Hence, along the same diagonal line, the diagonal coordinate D is the same. The reverse diagonal scan order employed by residual decoding under regular mode is from D=6 to D=0. The forward diagonal scan order employed by residual decoding under TS mode is from D=0 to D=6.

Figure 4:
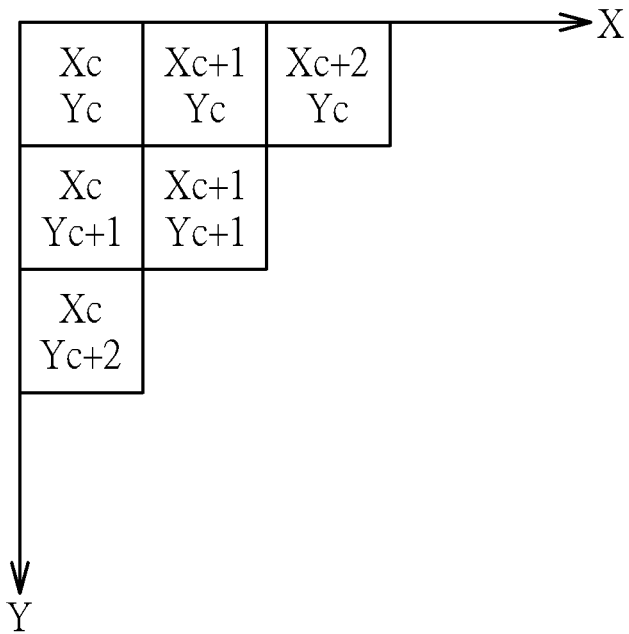
FIG. 4 is a diagram illustrating neighbor data dependency for residual syntax decoding of a current coefficient under the regular mode according to an embodiment of the present invention.

In each of the regular mode and the TS mode, a coefficient decoding loop may include three passes, where the first pass (pass 1) decoding may rely on a CABAC decoding process. Hence, neighbor data that belong to neighboring coefficients may be referenced by residual syntax decoding of a current coefficient for context selection. FIG. 4 is a diagram illustrating neighbor data dependency for residual syntax decoding of a current coefficient under the regular mode according to an embodiment of the present invention. The current coefficient is located at (Xc, Yc). In accordance with the reverse diagonal scan order shown in FIG. 1, five neighboring coefficients located at (Xc+1, Yc), (Xc+2, Yc), (Xc, Yc+1), (Xc+1, Yc+1), (Xc, Yc+2) are decoded prior to residual syntax decoding of the current coefficient located at (Xc, Yc). Hence, neighbor data that belong to neighboring coefficients may be referenced by residual syntax decoding of the current coefficient for context selection. For example, an AbsLevelPass1 value may be computed for each of the neighboring coefficients located at (Xc+1, Yc), (Xc+2, Yc), (Xc, Yc+1), (Xc+1, Yc+1), (Xc, Yc+2), where AbsLevelPass1=sig_coeff_flag+abs_level_gt1_flag+par_level_flag+2*abs_level_gt3_flag; an locSumAbsLevelPass1 value may be computed by a sum of AbsLevelPass1 values obtained from the neighboring coefficients located at (Xc+1, Yc), (Xc+2, Yc), (Xc, Yc+1), (Xc+1, Yc+1), (Xc, Yc+2); an locNumSig value may be computed by the number of non-zero absolute values of the neighboring coefficients located at (Xc+1, Yc), (Xc+2, Yc), (Xc, Yc+1), (Xc+1, Yc+1), (Xc, Yc+2); and an locSumAbs value may be computed by passing a sum of absolute values of the neighboring coefficients located at (Xc+1, Yc), (Xc+2, Yc), (Xc, Yc+1), (Xc+1, Yc+1), (Xc, Yc+2) through a clipping function, where locSumAbs=Clip3(0, 31, locSumAbs−baseLevel*5).

Figure 5:
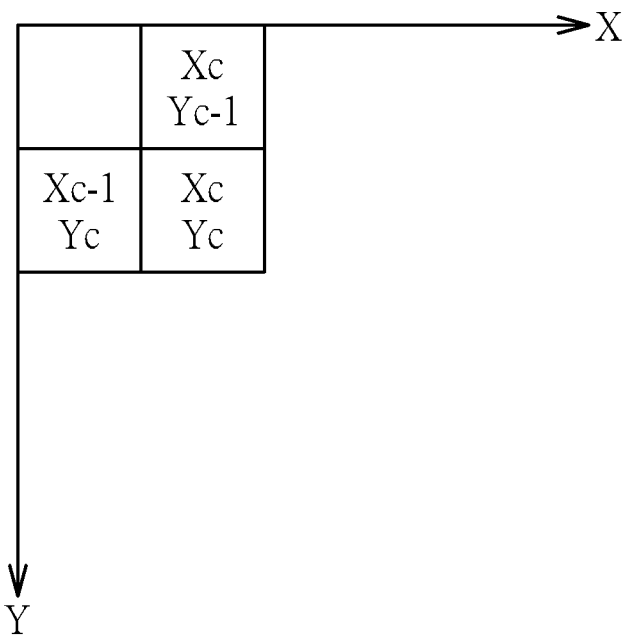
FIG. 5 is a diagram illustrating neighbor data dependency for residual syntax decoding of a current coefficient under the TS mode according to an embodiment of the present invention.

FIG. 5 is a diagram illustrating neighbor data dependency for residual syntax decoding of a current coefficient under the TS mode according to an embodiment of the present invention. The current coefficient is located at (Xc, Yc). In accordance with the forward diagonal scan order shown in FIG. 1, two neighboring coefficients located at (Xc, Yc−1), (Xc−1, Yc) are decoded prior to decoding of the current coefficient located at (Xc, Yc). Hence, neighbor data that belong to neighboring coefficients may be referenced by residual decoding of the current coefficient for context selection. For example, a locNumSig value may be computed by the number of non-zero absolute values of the neighboring coefficients located at (Xc, Yc−1), (Xc−1, Yc); a leftSign value may be derived from the sign of the neighboring coefficient located at (Xc−1, Yc); and an aboveSign value may be derived from the sign of the neighboring coefficient located at (Xc, Yc−1).

As mentioned above, the conventional decoder design employs a neighbor storage device with a large size for video residual decoding, which results in a high hardware cost. To address this issue, the present invention proposes a neighbor storage mechanism which enables a neighbor storage device with a smaller size in video residual decoding.

Figure 6:
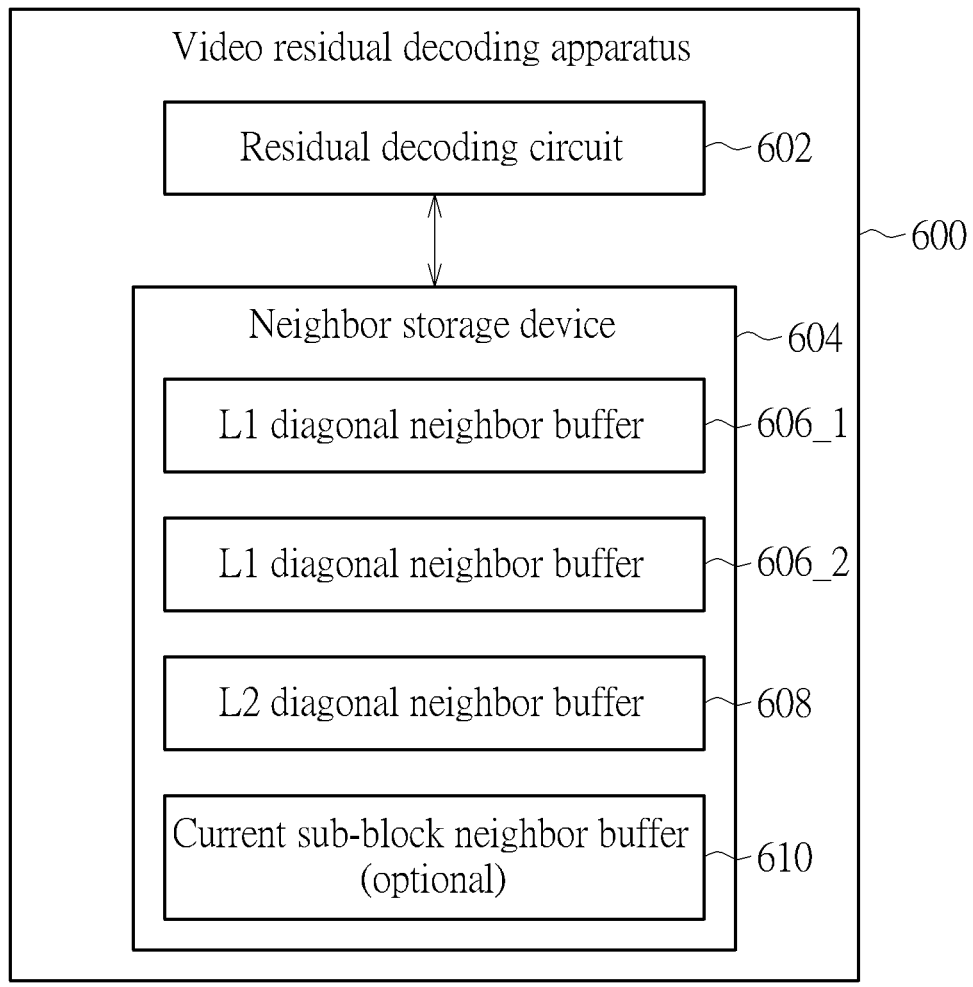
FIG. 6 is a diagram illustrating a video residual decoding apparatus according to an embodiment of the present invention.

FIG. 6 is a diagram illustrating a video residual decoding apparatus according to an embodiment of the present invention. The video residual decoding apparatus 600 may be a part of a video decoder such as a VVC/H.266 decoder. The video residual decoding apparatus 600 may include a residual decoding circuit 602 and a neighbor storage device 604. The residual decoding circuit 602 is arranged to apply residual decoding to a transform block (TB), wherein the transform block is divided into M sub-blocks (SBs), M is a positive integer, and the M sub-blocks are processed by the residual decoding in a diagonal scan order. For example, the diagonal scan order may be a reverse diagonal scan order as illustrated in FIG. 1 when the residual decoding of the transform block is performed under the regular mode. For another example, the diagonal scan order may be a forward diagonal scan order as illustrated in FIG. 2 when the residual decoding of the transform block is performed under the TS mode.

The neighbor storage device 604 is accessible to the residual decoding circuit 602, and is capable of providing neighbor data needed by a CABAC decoding process at the residual decoding circuit 602. For example, the neighbor storage device 604 may store neighbor data that belong to neighboring sub-blocks and are referenced by residual decoding of a current sub-block. The neighbor data belonging to a sub-block is derived from a residual decoding result of the sub-block, where the residual decoding result of the sub-block includes decoded syntax elements of coefficients in the sub-block. In this embodiment, a storage size of the neighbor storage device 604 is not larger than a maximum data amount of neighbor data derived from residual decoding results of N sub-blocks, where N is a positive integer, and N is smaller than M. For example, assuming that the maximum data amount of neighbor data belonging to one coefficient is A and the number of coefficients within one transform block is B, the storage size of the neighbor storage device 604 is allowed to be smaller than A*B.

In this embodiment, the neighbor storage device 604 may be configured to have two level 1 (L1) diagonal neighbor buffers 606_1, 606_2, one level 2 (L2) diagonal neighbor buffer 608, and one optional current sub-block neighbor buffer 610. A buffer size of the L1 diagonal neighbor buffer 606_1/606_2 may depend on a neighbor data buffering requirement of a diagonal line with a maximum length in the transform block. For example, the buffer size of the L1 diagonal neighbor buffer 606_1/606_2 may be equal to a data amount of neighbor data that belong to only a portion of coefficients in sub-blocks located at the diagonal line with the maximum length in the transform block. A buffer size of the L2 diagonal neighbor buffer 608 may depend on a neighbor data buffering requirement of a diagonal line with a second maximum length in the transform block. For example, the buffer size of the L2 diagonal neighbor buffer 608 may be equal to a data amount of neighbor data that belong to only a portion of coefficients in sub-blocks located at the diagonal line with the second maximum length in the transform block. A buffer size of the current sub-block neighbor buffer 610 may depend on a neighbor data buffering requirement of a single sub-block. For example, the buffer size of the current sub-block neighbor buffer 610 may not be larger than the maximum data amount of neighbor data belonging to all coefficients in one sub-block.

In some embodiments of the present invention, the neighbor storage device 604 may be designed to meet the residual decoding requirement of a worst case. In other words, the L1 diagonal neighbor buffers 606_1, 606_2, the L2 diagonal neighbor buffer 608, and the current sub-block neighbor buffer 610 should be large enough to accommodate neighbor data needed for residual decoding of one diagonal line that requires the largest amount of neighbor data among residual decoding of all diagonal lines in the transform block. For example, the worst case that needs the largest amount of neighbor data for decoding sub-blocks at a diagonal line may occur under a condition that a transform block with a maximum TB size is decoded in a regular mode. FIG. 7 is a diagram illustrating a case where the neighbor storage device 604 is used to provide neighbor data needed for context selection during regular-mode decoding of one largest transform block. In this example, the transform block has the maximum TB size being 32×32. In addition, the transform block is divided into 64 sub-blocks, each having an SB size being 4×4. As illustrated in FIG. 4, residual syntax decoding of a current coefficient at (Xc, Yc) requires neighbor data belonging to neighboring coefficients at (Xc+1, Yc), (Xc+2, Yc), (Xc, Yc+1), (Xc+1, Yc+1), (Xc, Yc+2). When the current coefficient at (Xc, Yc) is included in one sub-block located at the current decoding diagonal line D (D=6) shown in FIG. 7, it is possible that one or more of the neighboring coefficients at (Xc+1, Yc), (Xc+2, Yc), (Xc, Yc+1), (Xc+1, Yc+1), (Xc, Yc+2) are included in sub-block(s) located at the previous decoded diagonal line (D+1) shown in FIG. 7 (or included in sub-block(s) located at the previous decoded diagonal line (D+1) shown in FIG. 7 and one sub-block located at the previous decoded diagonal line (D+2) shown in FIG. 7). Regarding decoding of the sub-blocks at the current decoding diagonal line D, the required neighbor data belonging to sub-blocks at the previous decoded diagonal line (D+1) are stored in one L1 diagonal neighbor buffer 606_1/606_2, and the required neighbor data belonging to sub-blocks at the previous decoded diagonal line (D+2) are stored in the L2 diagonal neighbor buffer 608.

Figure 8:
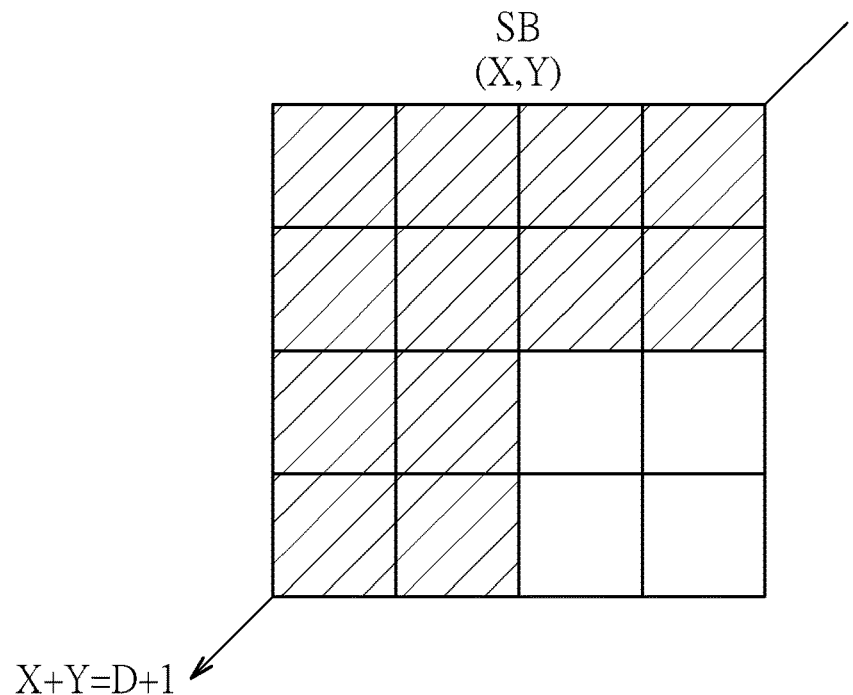
FIG. 8 is a diagram illustrating the number of storage units allocated in the level 1 (L1) diagonal neighbor buffer for storing required neighbor data belonging to one sub-block at one previous decoded diagonal line according to an embodiment of the present invention.

FIG. 8 is a diagram illustrating the number of storage units allocated in the L1 diagonal neighbor buffer 606_1/606_2 for storing required neighbor data belonging to one sub-block at the previous decoded diagonal line (D+1) according to an embodiment of the present invention. As shown in FIG. 8, neighbor data derived from residual decoding results of coefficients located at coefficient locations within the slanted area are required to be stored in the L1 diagonal neighbor buffer 606_1/606_2. Hence, regarding one sub-block, S K1-bit storage units may be allocated in the L1 diagonal neighbor buffer 606_1/606_2 for storing required neighbor data, where S=12. In one embodiment, each K1-bit storage unit may be configured to store sig_coeff_flag, AbsLevelPass1, and clipped AbsLevel (i.e. IocSumAbs) derived from a residual decoding result of one coefficient, and may have a storage size of at least 10 bits (i.e. K1=1+3+6=10). In another embodiment, since AbsLevelPass1==0 means sig_coeff_flag=0 and AbsLevelPass1==1 means sig_coeff_flag=1, each K1-bit storage unit may be configured to store AbsLevelPass1 and clipped AbsLevel (i.e. IocSumAbs) derived from a residual decoding result of one coefficient, and may have a storage size of at least 9 bits (i.e. K1=3+6=9). In yet another embodiment, each K1-bit storage unit may be configured to store more than 10 bits (i.e., K1>10). The buffer size of the L1 diagonal neighbor buffer 606_1/606_2 may be set by M×N, where M=S×K1-bits, and N represents the number of sub-blocks located at a diagonal line with a maximum length in the transform block. For a transform block with a maximum TB size being 32×32, N is equal to 8 as illustrated in FIG. 7.

Figure 9:
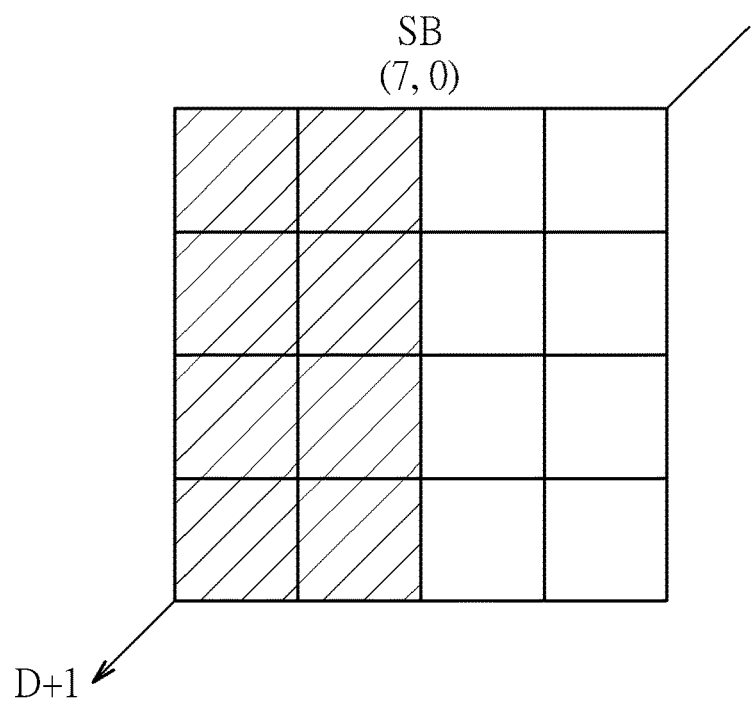
FIG. 9 is a diagram illustrating the number of storage units allocated in the L1 diagonal neighbor buffer for storing required neighbor data belonging to a head sub-block at one previous decoded diagonal line according to an embodiment of the present invention.
Figure 10:
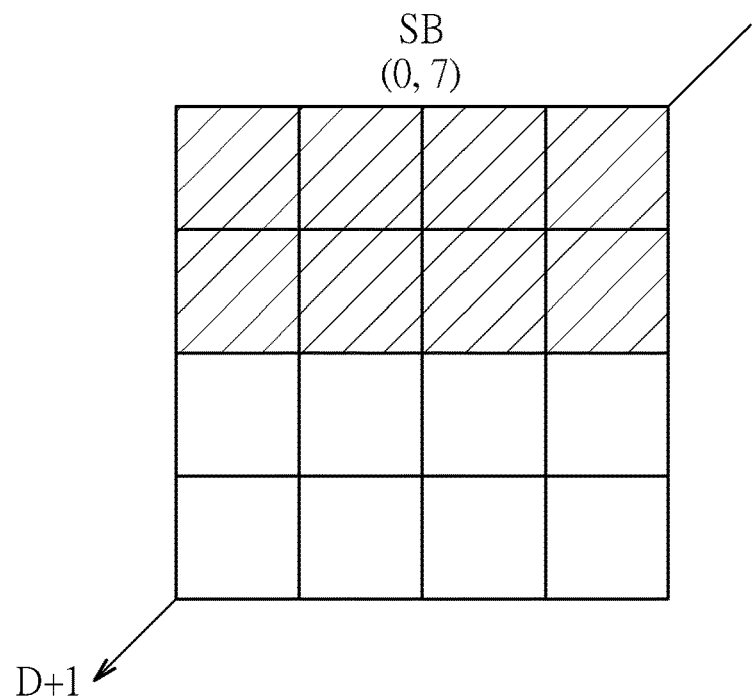
FIG. 10 is a diagram illustrating the number of storage units allocated in the L1 diagonal neighbor buffer for storing required neighbor data belonging to a tail sub-block at one previous decoded diagonal line according to an embodiment of the present invention.

In some embodiments of the present invention, the number of storage units allocated in the L1 diagonal neighbor buffer 606_1/606_2 for storing required neighbor data belonging to a head sub-block at the previous decoded diagonal line (D+1) may be reduced to be smaller than 12 (i.e. S<12 for neighbor data buffering of head sub-block), and/or the number of storage units allocated in the L1 diagonal neighbor buffer 606_1/606_2 for storing required neighbor data belonging to a tail sub-block at the previous decoded diagonal line (D+1) may be reduced to be smaller than 12 (i.e. S<12 for neighbor data buffering of tail sub-block). FIG. 9 is a diagram illustrating the number of storage units allocated in the L1 diagonal neighbor buffer 606_1/606_2 for storing required neighbor data belonging to a head sub-block at the previous decoded diagonal line (D+1) according to an embodiment of the present invention. FIG. 10 is a diagram illustrating the number of storage units allocated in the L1 diagonal neighbor buffer 606_1/606_2 for storing required neighbor data belonging to a tail sub-block at the previous decoded diagonal line (D+1) according to an embodiment of the present invention. Due to inherent characteristics of the data dependency, only neighbor data derived from residual decoding results of eight coefficients located at coefficient locations within the slanted area of the head sub-block are actually required to be stored in the L1 diagonal neighbor buffer 606_1/606_2, and only neighbor data derived from residual decoding results of eight coefficients located at coefficient locations within the slanted area of the tail sub-block are actually required to be stored in the L1 diagonal neighbor buffer 606_1/606_2. Hence, the hardware cost of the L1 diagonal neighbor buffer 606_1/606_2 can be further reduced.

Figure 11:
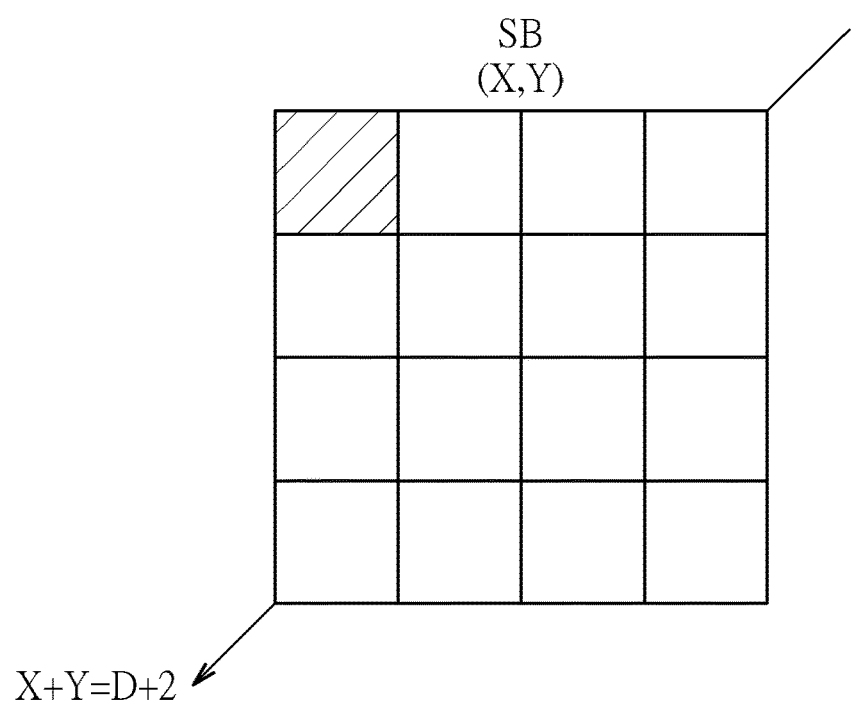
FIG. 11 is a diagram illustrating the number of storage units allocated in the level 2 (L2) diagonal neighbor buffer for storing required neighbor data belonging to one sub-block at another previous decoded diagonal line according to an embodiment of the present invention.

FIG. 11 is a diagram illustrating the number of storage units allocated in the L2 diagonal neighbor buffer 608 for storing required neighbor data belonging to one sub-block at another previous decoded diagonal line (D+2) according to an embodiment of the present invention. As shown in FIG. 11, neighbor data derived from a residual decoding result of a single coefficient located at a coefficient location within the slanted area are required to be stored in the L2 diagonal neighbor buffer 608. Hence, regarding one coefficient, one K1-bit storage unit may be allocated in the L2 diagonal neighbor buffer 608 for storing required neighbor data. In one embodiment, each K1-bit storage unit may be configured to store sig_coeff_flag, AbsLevelPass1, and clipped AbsLevel (i.e. IocSumAbs) derived from a residual decoding result of one coefficient, and may have a storage size of at least 10 bits (i.e. K1=1+3+6=10). In another embodiment, since AbsLevelPass1==0 means sig_coeff_flag=0 and AbsLevelPass1==1 means sig_coeff_flag=1, each K1-bit storage unit may be configured to store AbsLevelPass1 and clipped AbsLevel (i.e. IocSumAbs) derived from a residual decoding result of one coefficient, and may have a storage size of at least 9 bits (i.e. K1=3+6=9). In yet another embodiment, each K1-bit storage unit may be configured to store more than 10 bits (i.e. K1>10). The buffer size of the L2 diagonal neighbor buffer 608 may be set by G×K1-bits, where G represents the number of sub-blocks located at a diagonal line with a second maximum length in the transform block. For a transform block with a maximum TB size being 32×32, G is equal to 7 as illustrated in FIG. 7.

During residual decoding of a current sub-block located at the current decoding diagonal line D (D=6) shown in FIG. 7, the current sub-block neighbor buffer 610 may be employed to store neighbor data that belong to the current sub-block. For example, the neighbor data that belong to the current sub-block may include neighbor data that belong to all coefficients within the current sub-block. Hence, the neighbor data that belong to the current sub-block may include neighbor data belonging to one coefficient of the current sub-block that are referenced for residual syntax decoding of another coefficient within the same sub-block, and may also include neighbor data belonging to one coefficient of the current sub-block that are referenced for residual syntax decoding of another coefficient in a different sub-block (i.e. a sub-block adjacent to the current sub-block). The buffer size of the current sub-block neighbor buffer 610 may be set by L×K1-bits, where L represents the number of coefficients within the current sub-block. For a sub-block with an SB size being 4×4, L is equal to 16. In one embodiment, each K1-bit storage unit may be configured to store sig_coeff_flag, AbsLevelPass1, and clipped AbsLevel (i.e. IocSumAbs) derived from a residual decoding result of one coefficient, and may have a storage size of at least 10 bits (i.e. K1=1+3+6=10). In another embodiment, since AbsLevelPass1==0 means sig_coeff_flag=0 and AbsLevelPass1==1 means sig_coeff_flag=1, each K1-bit storage unit may be configured to store AbsLevelPass1 and clipped AbsLevel (i.e. IocSumAbs) derived from a residual decoding result of one coefficient, and may have a storage size of at least 9 bits (i.e. K1=3+6=9). In yet another embodiment, each K1-bit storage unit may be configured to store more than 10 bits (i.e. K>10).

In this embodiment, the video residual decoding apparatus 600 may be configured to support a first neighbor storage mechanism and a second neighbor storage mechanism, where the first neighbor storage mechanism adopts a ping-pong buffering technique, and the second neighbor storage mechanism adopts a buffer sharing technique. Compared to the first neighbor storage mechanism, the second neighbor storage mechanism may have a lower buffer requirement.

Figure 12:
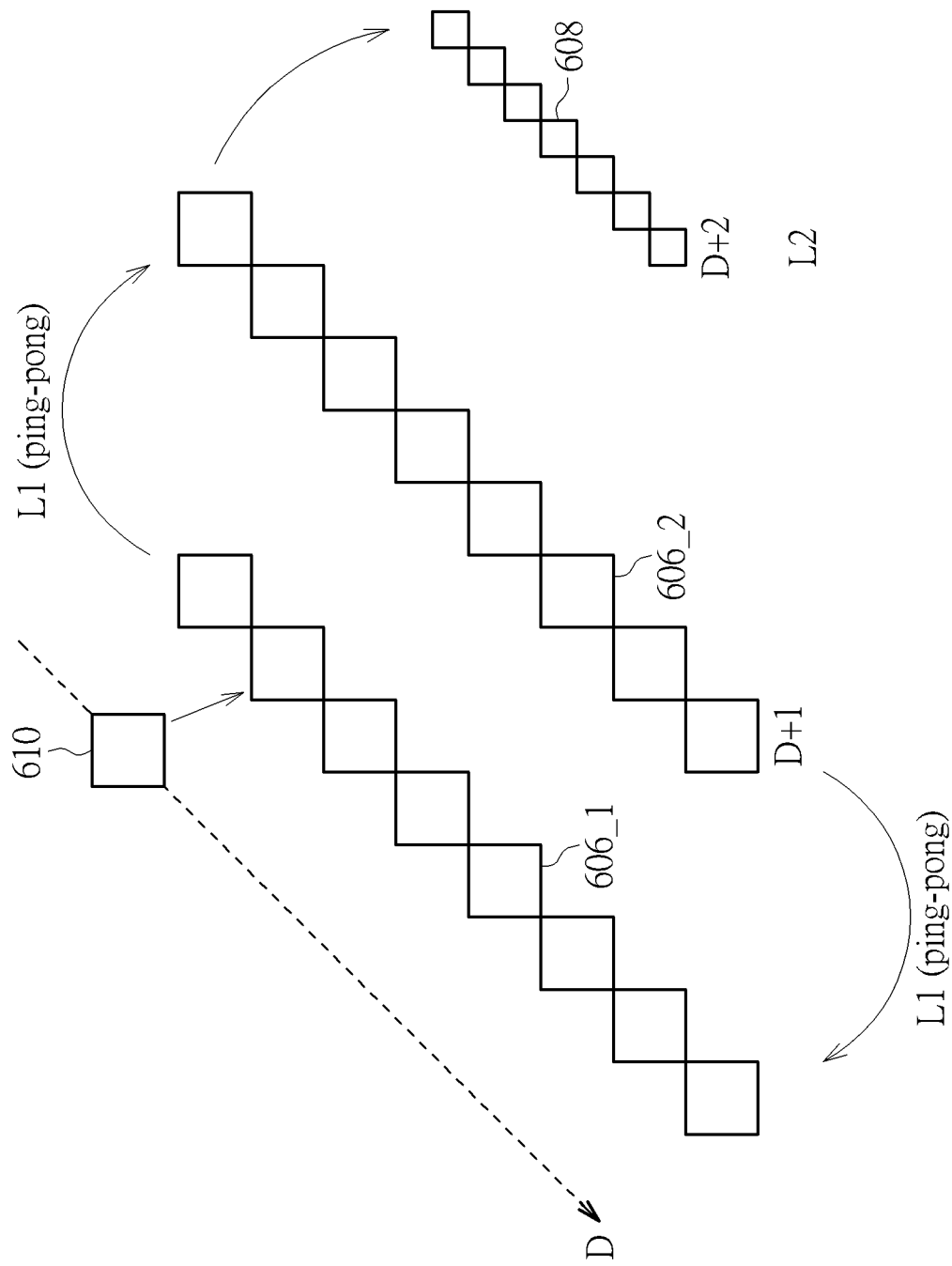
FIG. 12 is a diagram illustrating a first arrangement of the neighbor storage device for residual decoding of one transform block according to an embodiment of the present invention.

In accordance with the first neighbor storage mechanism in video residual decoding, the video residual decoding apparatus 600 may perform residual decoding of one transform block in the regular mode by using two L1 diagonal neighbor buffers 606_1, 606_2, the L2 diagonal neighbor buffer 608, and the current sub-block neighbor buffer 610. FIG. 12 is a diagram illustrating a first arrangement of the neighbor storage device 604 for residual decoding of one transform block according to an embodiment of the present invention. When the first neighbor storage mechanism is enabled for the regular-mode residual decoding, the L1 diagonal neighbor buffers 606_1 and 606_2 operate like a ping-pong buffer. Specifically, when one of the L1 diagonal neighbor buffers 606_1 and 606_2 is used to buffer neighbor data that belong to sub-blocks located at a current diagonal line D, the other of the L1 diagonal neighbor buffers 606_1 and 606_2 is used to buffer neighbor data that belong to sub-blocks located at a previous diagonal line (D+1). In the embodiment shown in FIG. 12, the L1 diagonal neighbor buffer 606_1 is currently used to buffer neighbor data that belong to sub-blocks located at the current diagonal line D and are referenced by the residual decoding of sub-blocks located at a next diagonal line (D−1). According to the reverse diagonal scan order, the residual decoding of the sub-blocks located at the current diagonal line D is followed by the residual decoding of the sub-blocks located at the next diagonal line (D−1). Regarding the other L1 diagonal neighbor buffer 606_2, it is currently used to buffer neighbor data that belong to sub-blocks located at the previous diagonal line (D+1) and are referenced by the residual decoding of the sub-blocks located at the current diagonal line D. According to the reverse diagonal scan order, the residual decoding of the sub-blocks located at the previous diagonal line (D+1) is followed by the residual decoding of the sub-blocks located at the current diagonal line D.

At an end of the residual decoding of the sub-blocks located at the current diagonal line D, the L1 diagonal neighbor buffer 606_2 is arranged to start buffering neighbor data that belong to the sub-blocks located at the next diagonal line (D−1). That is, at the end of the residual decoding of the sub-blocks located at the current diagonal line D, the next diagonal line (D−1) becomes a current diagonal line to be decoded. During the residual decoding of the sub-blocks located at the current diagonal line (D−1), the L1 diagonal neighbor buffer 606_1 buffers neighbor data that belong to sub-blocks located at the previous diagonal line D and are referenced by the residual decoding of the sub-blocks located at the current diagonal line (D−1).

During the residual decoding of the sub-blocks located at the current diagonal line D, the L2 diagonal neighbor buffer 608 is arranged to buffer neighbor data that belong to sub-blocks located at another previous diagonal line (D+2) and are referenced by the residual decoding of the sub-blocks located at the current diagonal line D. According to the reverse diagonal scan order, the residual decoding of the sub-blocks located at the previous diagonal line (D+2) is followed by the residual decoding of the sub-blocks located at the previous diagonal line (D+1). At the end of the residual decoding of the sub-blocks located at the current diagonal line D, the next diagonal line (D−1) becomes a current diagonal line to be decoded, and partial data stored in the L1 diagonal neighbor buffer 606_2 are pushed into the L2 diagonal neighbor buffer 608. During the residual decoding of the sub-blocks located at the current diagonal line (D−1), the L2 diagonal neighbor buffer 608 buffers neighbor data that belong to sub-blocks located at the previous diagonal line (D+1) and are referenced by the residual decoding of the sub-blocks located at the current diagonal line (D−1).

The current sub-block neighbor buffer 610 is arranged to buffer neighbor data that belong to a current sub-block located at the current diagonal line D during the residual decoding of the current sub-block. Consider a case where the residual decoding of the current sub-block indicates that the current sub-block has at least one non-zero coefficient. At an end of the residual decoding of the current sub-block, the neighbor data that belong to the current sub-block and are stored in the current sub-block neighbor buffer 610 are pushed into a storage area allocated in the L1 diagonal neighbor buffer 606_1. Hence, the neighbor data that belong to the current sub-block and stored in the L1 diagonal neighbor buffer 606_1 can be later referenced by the residual decoding of sub-blocks at the diagonal line (D−1).

Consider another case where the residual decoding of the current sub-block indicates that the current sub-block has all zero coefficients. A storage area allocated in the L1 diagonal neighbor buffer 606_1 for storing the neighbor data that belong to the current sub-block is cleared, which is equivalent to pushing the neighbor data (which are zero coefficients) that belong to the current sub-block into the L1 diagonal neighbor buffer 606_1. Similarly, the neighbor data (which are zero coefficients) that belong to the current sub-block and stored in the L1 diagonal neighbor buffer 606_1 can be later referenced by the residual decoding of sub-blocks at the diagonal line (D−1).

Figure 13:
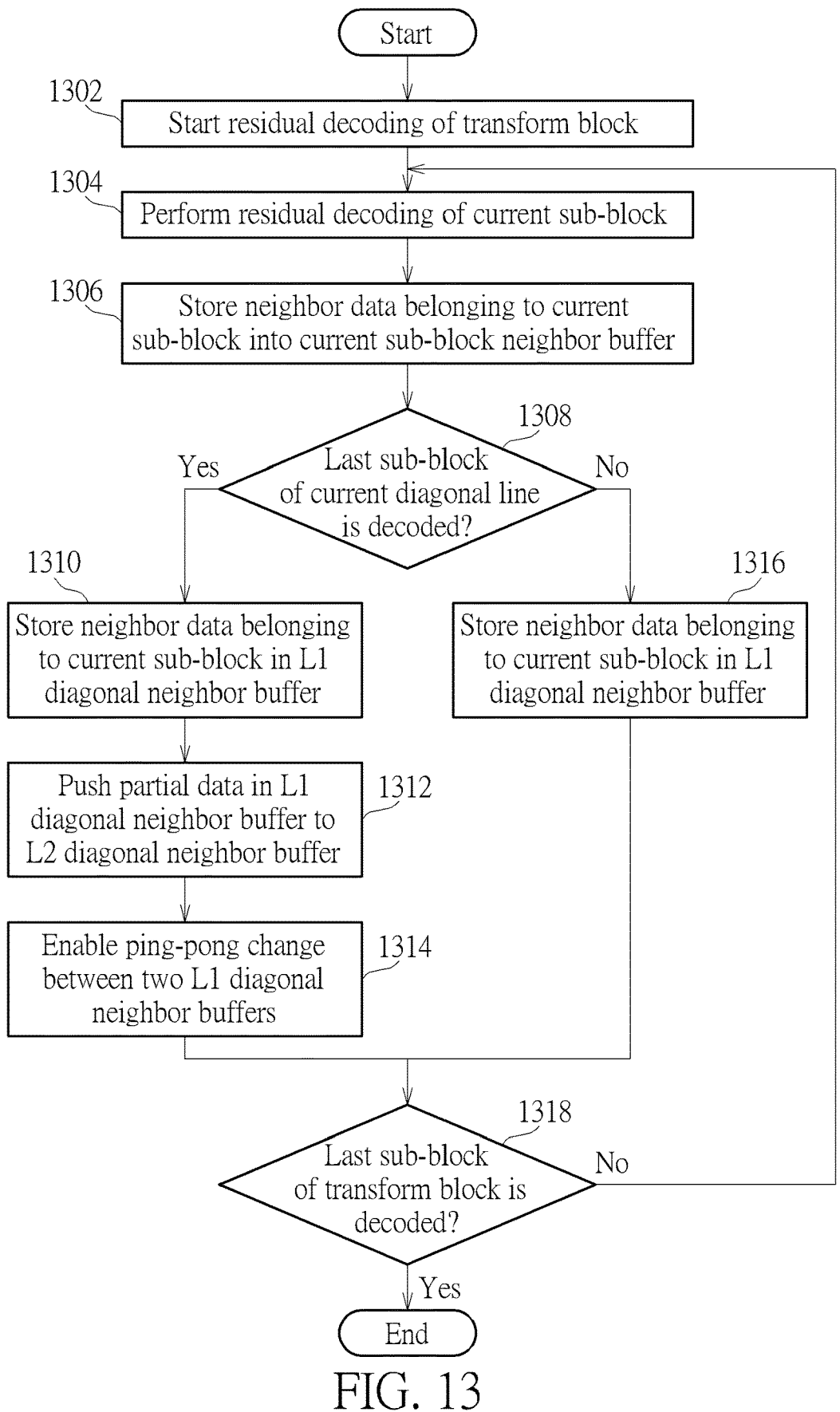
FIG. 13 is a flowchart illustrating a first regular-mode video residual decoding method according to an embodiment of the present invention.

FIG. 13 is a flowchart illustrating a first regular-mode video residual decoding method according to an embodiment of the present invention. Provided that the result is substantially the same, the steps are not required to be executed in the exact order shown in FIG. 13. The video residual decoding method may be employed by the video residual decoding apparatus 600 shown in FIG. 6. At step 1302, the residual decoding circuit 602 starts residual decoding of a transform block. At step 1304, the residual decoding circuit 602 performs residual decoding of a current sub-block which is selected from the transform block according to a diagonal scan order. At step 1306, the residual decoding circuit 602 stores neighbor data belonging to the current sub-block into the current sub-block neighbor buffer 610 during the residual decoding of the current block. At step 1308, the residual decoding circuit 602 checks if the last sub-block located at the current diagonal line is decoded. If yes, the flow proceeds with step 1310. If no, the flow proceeds with step 1316. Hence, if the current sub-block is the last sub-block located at the current diagonal line and decoding of the current sub-block is completed, the flow proceeds with step 1310. If the current sub-block is not the last sub-block located at the current diagonal line and decoding of the current sub-block is completed, the flow proceeds with step 1316.

At each of step 1310 and step 1316, the neighbor data belonging to the current sub-block are stored in one L1 diagonal neighbor buffer 606_1 (or 606_2). For example, the residual decoding circuit 602 may push the neighbor data in the current sub-block neighbor buffer 610 to a storage space allocated in the L1 diagonal neighbor buffer 606_1 (or 606_2) when the neighbor data includes one or more non-zero coefficients. For another example, the residual decoding circuit 602 may simply instruct the L1 diagonal neighbor buffer 606_1 (or 606_2) to clear a storage space allocated in the L1 diagonal neighbor buffer 606_1 (or 606_2) when the neighbor data includes all zero coefficients. At step 1312, the residual decoding circuit 602 pushes partial data in the L1 diagonal neighbor buffer 606_1 (or 606_2) to the L2 diagonal neighbor buffer 608. At step 1314, the residual decoding circuit 602 enables a ping-pong change between the L1 diagonal neighbor buffers 606_1 and 606_2. At step 1318, the residual decoding circuit 602 checks if a last sub-block of the transform block is decoded. If yes, the video residual decoding flow is ended. If no, the flow proceeds with step 1304, and a next sub-block that is selected from the transform block according to the diagonal scan order becomes a current sub-block to be decoded at step 1304.

Figure 14:
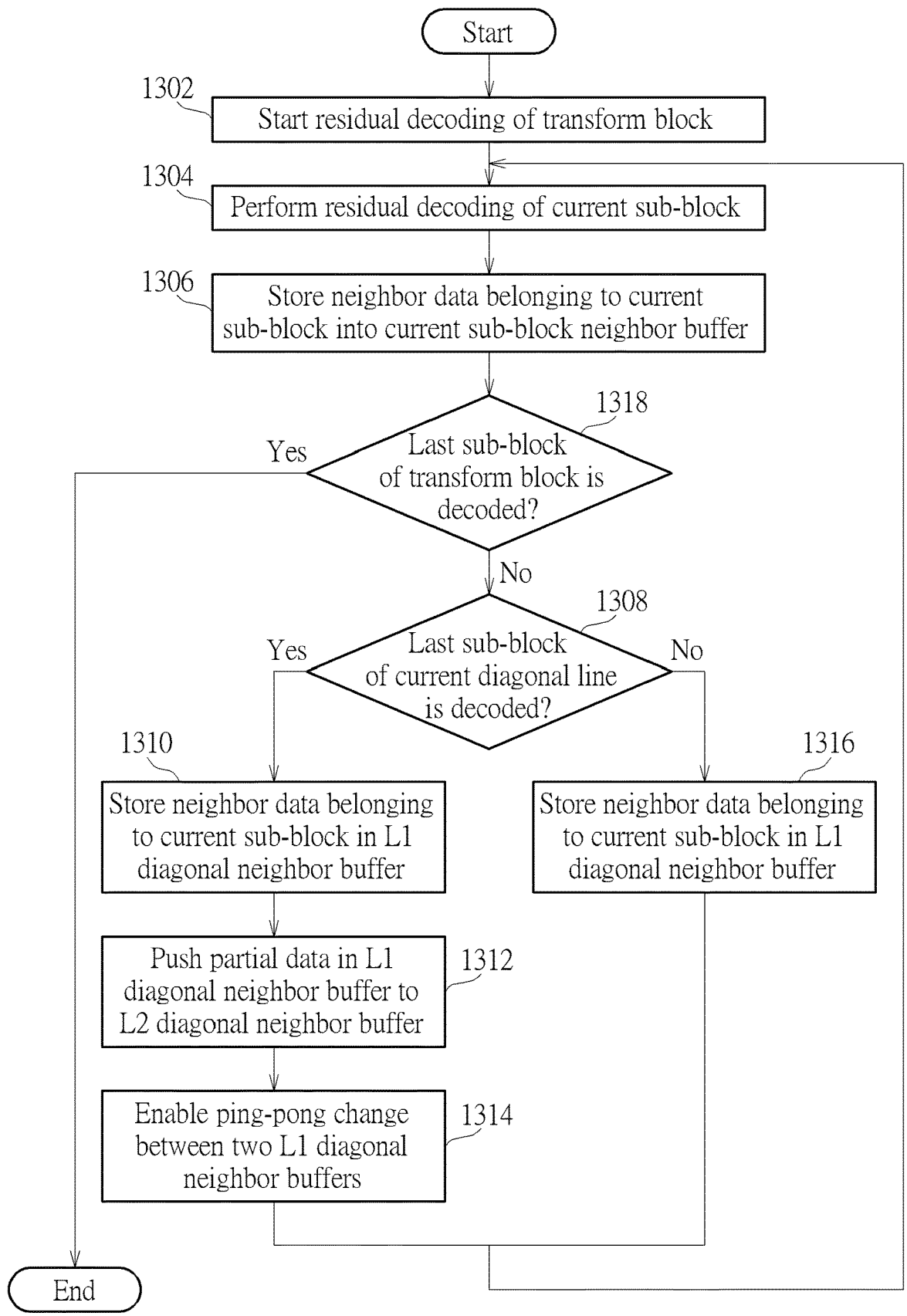
FIG. 14 is a flowchart illustrating a first alternative regular-mode video residual decoding method according to an embodiment of the present invention.

In accordance with the flow shown in FIG. 13, steps 1310, 1312, 1314 are performed when it is determined that the last sub-block of the transform block is decoded (step 1308). Since the video residual decoding uses one transform block as a decoding unit, the video residual decoding of one transform block is ended after steps 1310, 1312, 1314 are redundantly performed in response to decoding of the last sub-block of the transform block. FIG. 14 is a flowchart illustrating a first alternative regular-mode video residual decoding method according to an embodiment of the present invention. Provided that the result is substantially the same, the steps are not required to be executed in the exact order shown in FIG. 14. The major difference between the flows shown in FIG. 13 and FIG. 14 is that step 1306 is followed by step 1318. In this way, the video residual decoding of one transform block is ended when it is determined that the last sub-block of the transform block is decoded. That is, when the current sub-block is the last sub-block of the transform block and decoding of the current sub-block is completed, the video residual decoding of one transform block is ended without redundant handling of the neighbor data.

Figure 15:
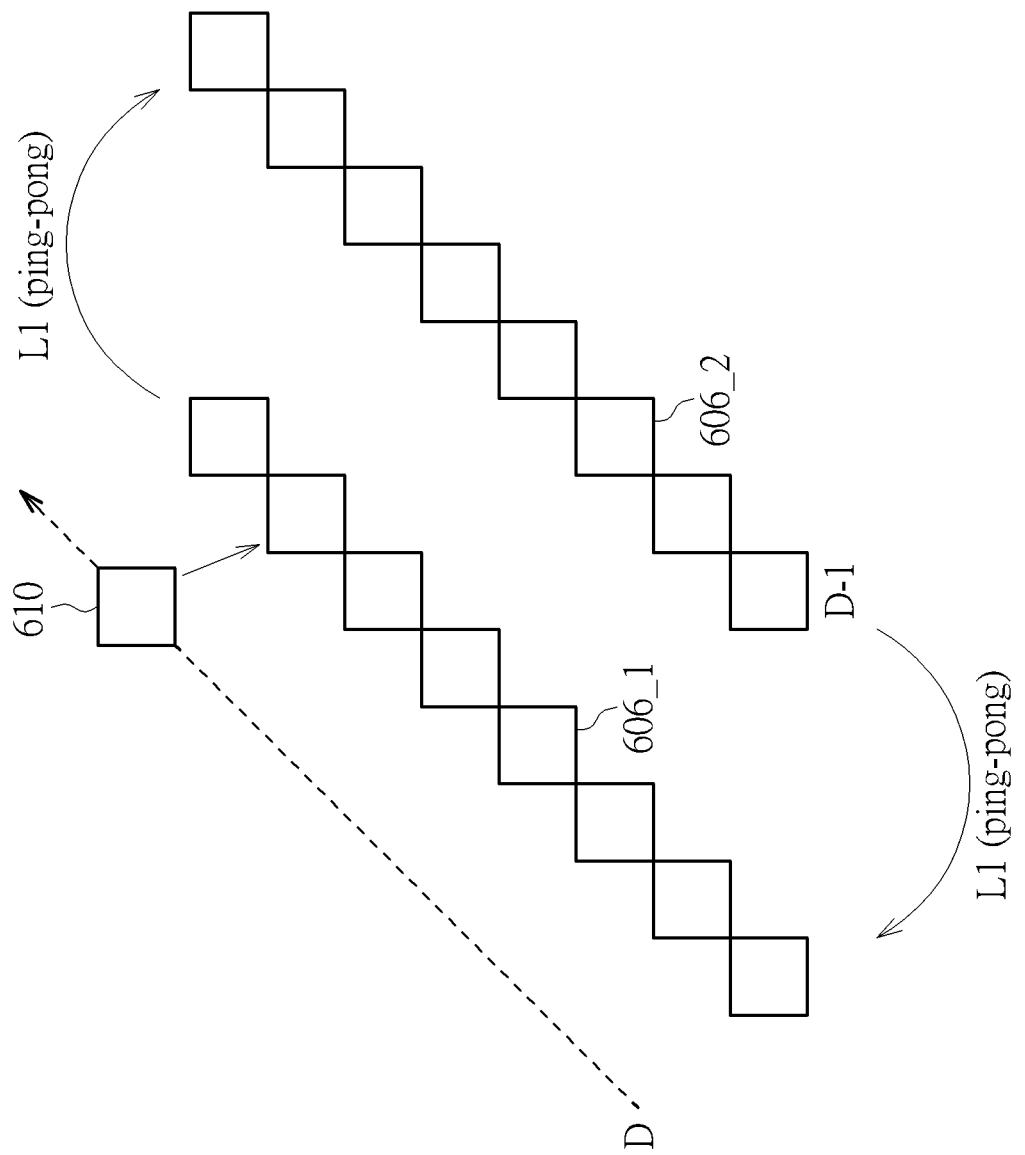
FIG. 15 is a diagram illustrating a second arrangement of the neighbor storage device for residual decoding of one transform block according to an embodiment of the present invention.

In accordance with the first neighbor storage mechanism in video residual decoding, the video residual decoding apparatus 600 may perform residual decoding of one transform block in the TS mode by using two L1 diagonal neighbor buffers 606_1, 606_2 and the current sub-block neighbor buffer 610, without the need of the L2 diagonal neighbor buffer 608. FIG. 15 is a diagram illustrating a second arrangement of the neighbor storage device 604 for residual decoding of one transform block according to an embodiment of the present invention. The major difference between arrangements of the neighbor storage device 604 shown in FIG. 12 and FIG. 15 is that the L2 diagonal neighbor buffer 608 is not needed in the TS mode. Similarly, when the first neighbor storage mechanism is enabled for the TS-mode residual decoding, the L1 diagonal neighbor buffers 606_1 and 606_2 operate like a ping-pong buffer. Specifically, when one of the L1 diagonal neighbor buffers 606_1 and 606_2 is used to buffer neighbor data that belong to sub-blocks located at a current diagonal line D, the other of the L1 diagonal neighbor buffers 606_1 and 606_2 is used to buffer neighbor data that belong to sub-blocks located at a previous diagonal line (D−1). In the embodiment shown in FIG. 15, the L1 diagonal neighbor buffer 606_1 is currently used to buffer neighbor data that belong to sub-blocks located at the current diagonal line D and are referenced by the residual decoding of sub-blocks located at a next diagonal line (D+1). According to the forward diagonal scan order, the residual decoding of the sub-blocks located at the current diagonal line D is followed by the residual decoding of the sub-blocks located at the next diagonal line (D+1). Regarding the L1 diagonal neighbor buffer 606_2, it is currently used to buffer neighbor data that belong to sub-blocks located at a previous diagonal line (D−1) and are referenced by the residual decoding of the sub-blocks located at the current diagonal line D. According to the forward diagonal scan order, the residual decoding of the sub-blocks located at the previous diagonal line (D−1) is followed by the residual decoding of the sub-blocks located at the current diagonal line D.

At an end of the residual decoding of the sub-blocks located at the current diagonal line D, the L1 diagonal neighbor buffer 606_2 is arranged to start buffering neighbor data that belong to the sub-blocks located at the next diagonal line (D+1). That is, at the end of the residual decoding of the sub-blocks located at the current diagonal line D, the next diagonal line (D+1) becomes a current diagonal line to be decoded. During the residual decoding of the sub-blocks located at the current diagonal line (D+1), the L1 diagonal neighbor buffer 606_1 buffers neighbor data that belong to sub-blocks located at the previous diagonal line D and are referenced by the residual decoding of the sub-blocks located at the current diagonal line (D+1).

The current sub-block neighbor buffer 610 is arranged to buffer neighbor data that belong to a current sub-block located at the current diagonal line D during the residual decoding of the current sub-block. Consider a case where the residual decoding of the current sub-block indicates that the current sub-block has at least one non-zero coefficient. At an end of the residual decoding of the current sub-block, the neighbor data that belong to the current sub-block and are stored in the current sub-block neighbor buffer 610 are pushed into a storage area allocated in the L1 diagonal neighbor buffer 606_1. Hence, the neighbor data that belong to the current sub-block and stored in the L1 diagonal neighbor buffer 606_1 can be later referenced by the residual decoding of sub-blocks at the diagonal line (D+1).

Consider another case where the residual decoding of the current sub-block indicates that the current sub-block has all zero coefficients. A storage area allocated in the L1 diagonal neighbor buffer for storing the neighbor data that belong to the current sub-block is cleared, which is equivalent to pushing the neighbor data (which are zero coefficients) that belong to the current sub-block into the L1 diagonal neighbor buffer 606_1. Similarly, the neighbor data (which are zero coefficients) that belong to the current sub-block and stored in the L1 diagonal neighbor buffer 606_1 can be later referenced by the residual decoding of sub-blocks at the diagonal line (D+1).

Figure 16:
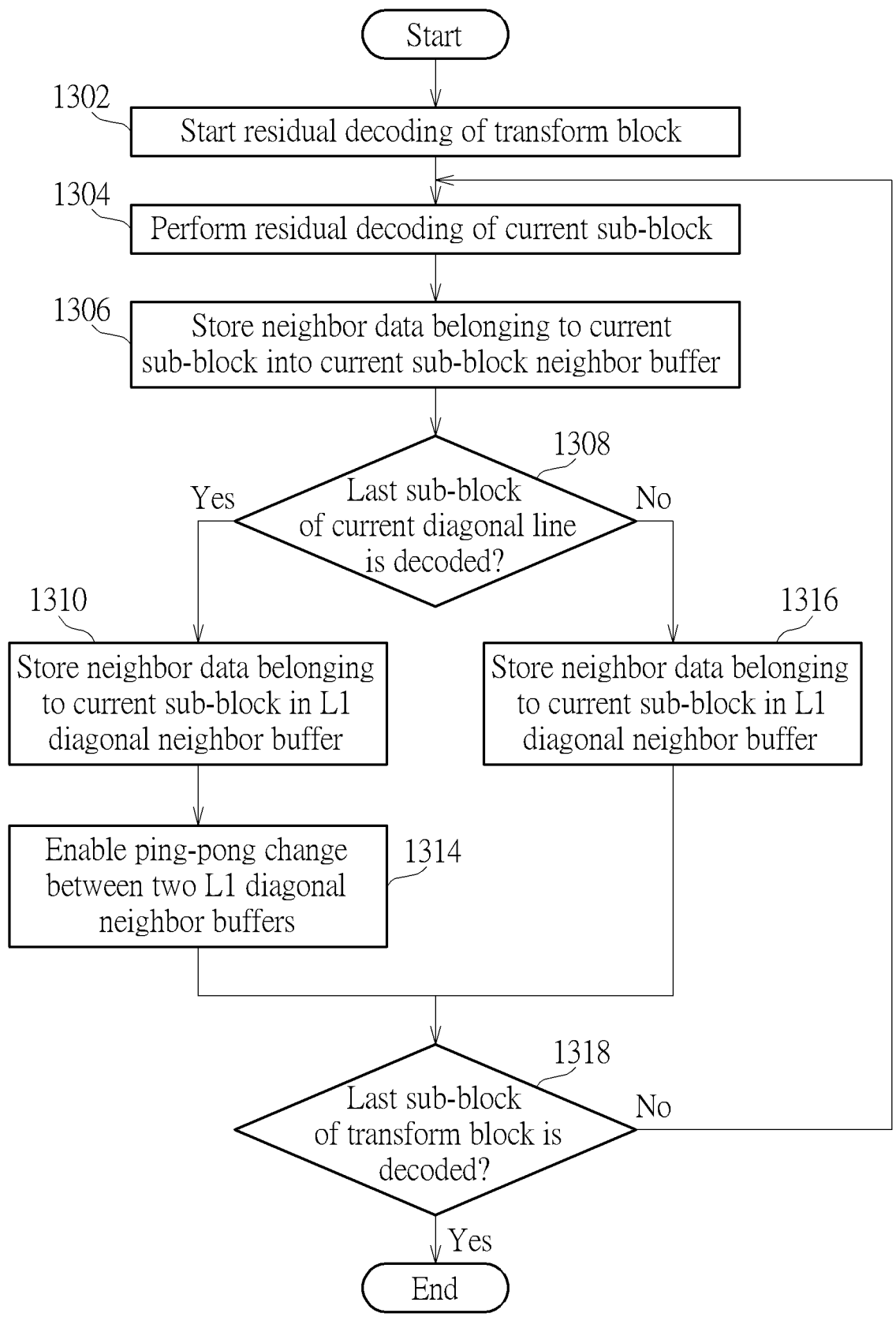
FIG. 16 is a flowchart illustrating a first TS-mode video residual decoding method according to an embodiment of the present invention.

FIG. 16 is a flowchart illustrating a first TS-mode video residual decoding method according to an embodiment of the present invention. Provided that the result is substantially the same, the steps are not required to be executed in the exact order shown in FIG. 16. The video residual decoding method may be employed by the video residual decoding apparatus 600 shown in FIG. 6. The major difference between the video residual decoding methods in FIG. 13 and FIG. 16 is that step 1312 is omitted from the video residual decoding method in FIG. 16. As a person skilled in the pertinent art can readily know details of the steps in FIG. 16 after reading above paragraphs directed to FIG. 13, further description is omitted here for brevity.

Figure 17:
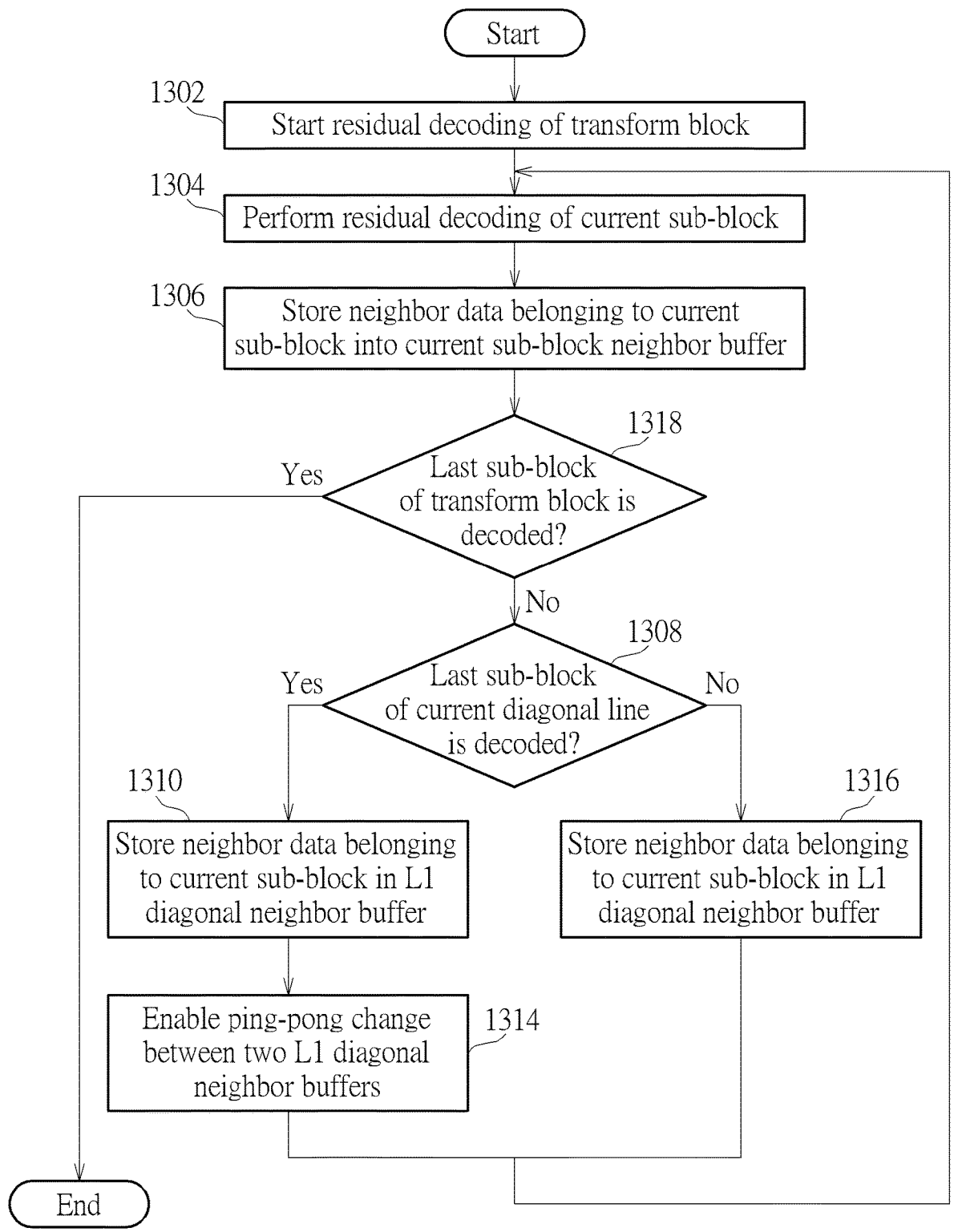
FIG. 17 is a flowchart illustrating a first alternative TS-mode video residual decoding method according to an embodiment of the present invention.

FIG. 17 is a flowchart illustrating a first alternative TS-mode video residual decoding method according to an embodiment of the present invention. Provided that the result is substantially the same, the steps are not required to be executed in the exact order shown in FIG. 17. The video residual decoding method may be employed by the video residual decoding apparatus 600 shown in FIG. 6. The major difference between the video residual decoding methods in FIG. 14 and FIG. 17 is that step 1312 is omitted from the video residual decoding method in FIG. 17. As a person skilled in the pertinent art can readily know details of the steps in FIG. 17 after reading above paragraphs directed to FIG. 14, further description is omitted here for brevity.

Figure 18:
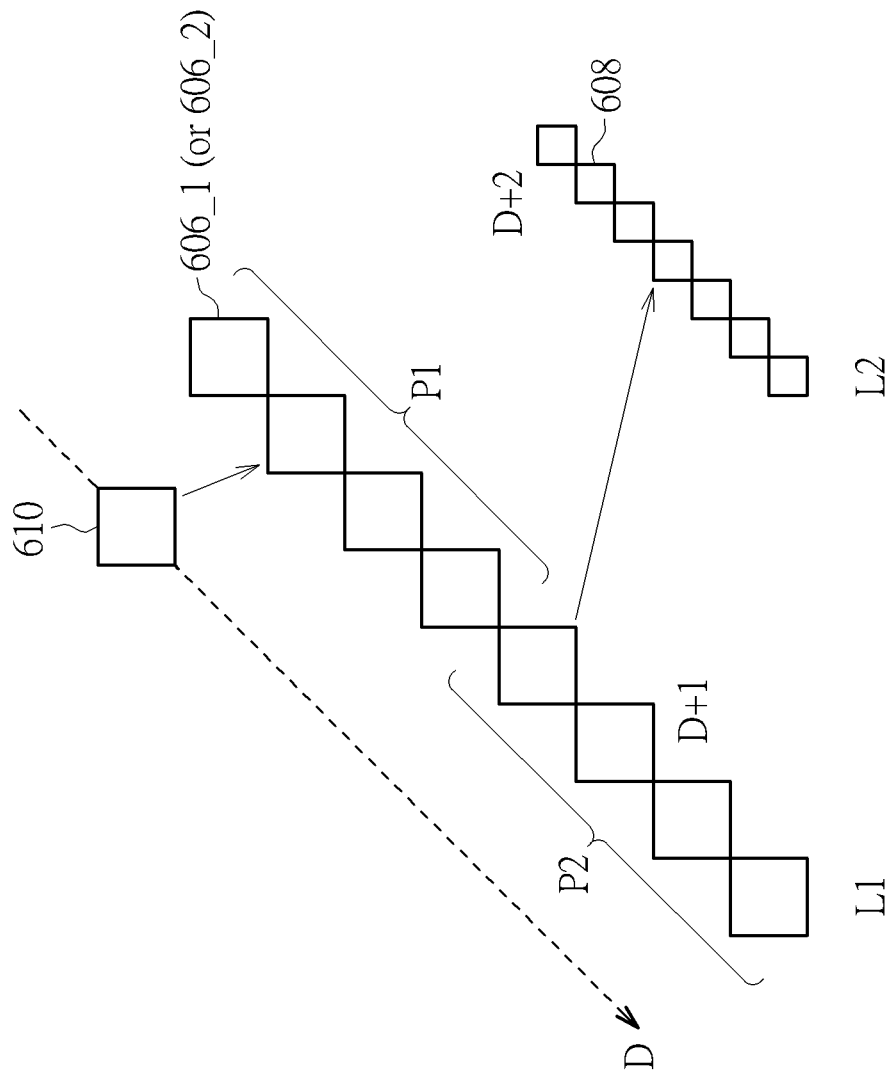
FIG. 18 is a diagram illustrating a third arrangement of the neighbor storage device 604 for residual decoding of one transform block mode according to an embodiment of the present invention.

In accordance with the second neighbor storage mechanism in video residual decoding, the video residual decoding apparatus 600 may perform residual decoding of one transform block in the regular mode by using one L1 diagonal neighbor buffer 606_1/606_2, the L2 diagonal neighbor buffer 608, and the current sub-block neighbor buffer 610. FIG. 18 is a diagram illustrating a third arrangement of the neighbor storage device 604 for residual decoding of one transform block according to an embodiment of the present invention. When the second neighbor storage mechanism is enabled for the regular-mode residual decoding, only one of the L1 diagonal neighbor buffers 606_1 and 606_2 is selected and used to serve as a shared buffer for buffering neighbor data belonging to sub-blocks located at a current diagonal line D and are referenced by the residual decoding of sub-blocks located at a next diagonal line (D−1), and for buffering neighbor data belonging to sub-blocks located at a previous diagonal line (D+1) and are referenced by the residual decoding of sub-blocks located at the current diagonal line D. According to the reverse diagonal scan order, the residual decoding of the sub-blocks located at the current diagonal line D is followed by the residual decoding of the sub-blocks located at the next diagonal line (D−1), and the residual decoding of the sub-blocks located at the previous diagonal line (D+1) is followed by the residual decoding of the sub-blocks located at the current diagonal line D.

Since a single L1 diagonal neighbor buffer 606_1/606_2 is shared for buffering neighbor data belonging to sub-blocks located at adjacent diagonal lines (which include the current diagonal line D and the previous diagonal line (D+1)), data overwriting occurs during the residual decoding of the sub-blocks located at the current diagonal line D. For example, during the residual decoding of the sub-blocks located at the current diagonal line D, neighbor data that belong to a sub-block located at the previous diagonal line (D+1) may be overwritten by neighbor data that belong to a sub-block located at the current diagonal line D. As shown in FIG. 18, the L1 diagonal neighbor buffer 606_1/606_2 may be regarded as having a current line part P1 and a previous line part P2 during the residual decoding of the sub-blocks located at the current diagonal line D, where the current line part P1 includes storage units that store neighbor data belonging to sub-blocks located at the current diagonal line D, and the previous line part P2 includes storage units that store neighbor data belonging to sub-blocks located at the previous diagonal line (D+1).

During the residual decoding of the sub-blocks located at the current diagonal line D, the L2 diagonal neighbor buffer 608 is arranged to buffer neighbor data that belong to sub-blocks located at another previous diagonal line (D+2) and are referenced by the residual decoding of the sub-blocks located at the current diagonal line D. According to the reverse diagonal scan order, the residual decoding of the sub-blocks located at the previous diagonal line (D+2) is followed by the residual decoding of the sub-blocks located at the previous diagonal line (D+1). It should be noted that, before neighbor data that belong to a first sub-block located at the previous diagonal line (D+1) are overwritten by neighbor data that belong to a second sub-block located at the current diagonal line D, partial data of the first sub-block located at the previous diagonal line (D+1) and stored in the L1 diagonal neighbor buffer 606_1/606_2 should be pushed into the L2 diagonal neighbor buffer 608. For example, the residual decoding circuit 602 may move partial neighbor data belonging to one sub-block from the L1 diagonal neighbor buffer 606_1/606_2 to the L2 diagonal neighbor buffer 608 each time residual decoding of one sub-block at the current diagonal line is completed.

The current sub-block neighbor buffer 610 is arranged to buffer neighbor data that belong to a current sub-block located at the current diagonal line D during the residual decoding of the current sub-block. Consider a case where the residual decoding of the current sub-block indicates that the current sub-block has at least one non-zero coefficient. At an end of the residual decoding of the current sub-block, the neighbor data that belong to the current sub-block and are stored in the current sub-block neighbor buffer 610 are pushed into a storage area allocated in the L1 diagonal neighbor buffer 606_1. For example, the neighbor data that belong to the current sub-block and are stored in the current sub-block neighbor buffer 610 are pushed into one storage unit of the previous line part P1, such that this storage unit of the previous line part P2 is overwritten and then becomes one storage unit of the current line part P1. Hence, the neighbor data that belong to the current sub-block and stored in the L1 diagonal neighbor buffer 606_1 can be later referenced by the residual decoding of sub-blocks at the diagonal line (D−1).

Consider another case where the residual decoding of the current sub-block indicates that the current sub-block has all zero coefficients. A storage area allocated in the L1 diagonal neighbor buffer for storing the neighbor data that belong to the current sub-block is cleared. For example, one storage unit of the previous line part P2 is cleared and then becomes one storage unit of the current line part P1. This is equivalent to pushing the neighbor data (which are zero coefficients) that belong to the current sub-block into the L1 diagonal neighbor buffer 606_1. Similarly, the neighbor data (which are zero coefficients) that belong to the current sub-block and stored in the L1 diagonal neighbor buffer 606_1 can be later referenced by the residual decoding of sub-blocks at the diagonal line (D−1).

Figure 19:
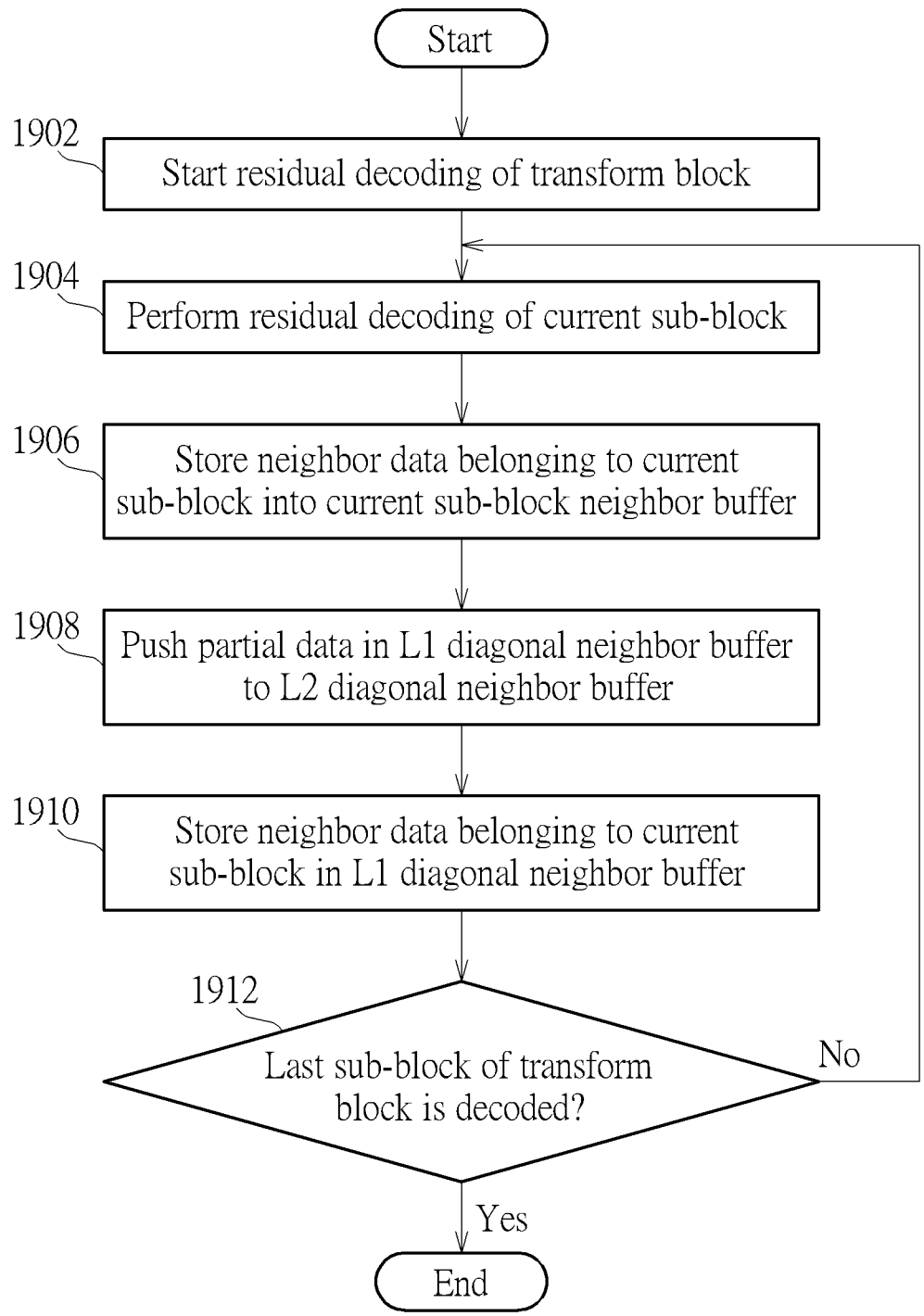
FIG. 19 is a flowchart illustrating a second regular-mode video residual decoding method according to an embodiment of the present invention.

FIG. 19 is a flowchart illustrating a second regular-mode video residual decoding method according to an embodiment of the present invention. Provided that the result is substantially the same, the steps are not required to be executed in the exact order shown in FIG. 19. The video residual decoding method may be employed by the video residual decoding apparatus 600 shown in FIG. 6. At step 1902, the residual decoding circuit 602 starts residual decoding of a transform block. At step 1904, the residual decoding circuit 602 performs residual decoding of a current sub-block which is selected from the transform block according to a diagonal scan order. At step 1906, the residual decoding circuit 602 stores neighbor data belonging to the current sub-block into the current sub-block neighbor buffer 610 during the residual decoding of the current block. At step 1908, the residual decoding circuit 602 pushes partial data in the L1 diagonal neighbor buffer 606_1/606_2 to the L2 diagonal neighbor buffer 608. At step 1910, the neighbor data belonging to the current sub-block are stored in the L1 diagonal neighbor buffer 606_1/606_2. For example, the residual decoding circuit 602 pushes the neighbor data in the current sub-block neighbor buffer 610 to a storage space allocated in the L1 diagonal neighbor buffer 606_1/606_2 when the neighbor data includes one or more non-zero coefficients. For another example, the residual decoding circuit 602 clears a storage space allocated in the L1 diagonal neighbor buffer 606_1/606_2 when the neighbor data includes all zero coefficients. At step 1912, the residual decoding circuit 602 checks if a last sub-block of the transform block is decoded. If yes, the video residual decoding flow is ended. If no, the flow proceeds with step 1904, and a next sub-block that is selected from the transform block according to the diagonal scan order becomes a current sub-block to be decoded at step 1904.

Figure 20:
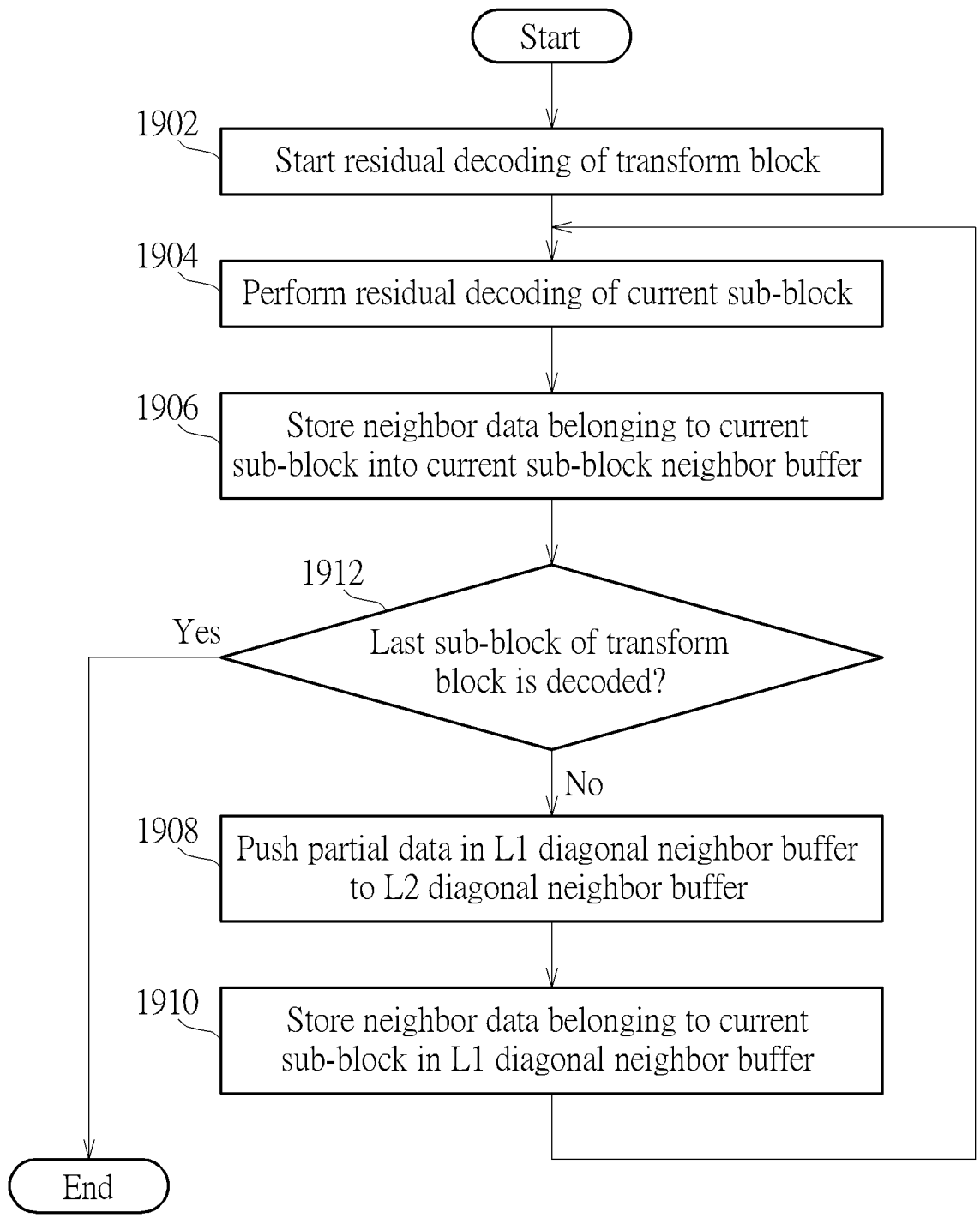
FIG. 20 is a flowchart illustrating a second alternative regular-mode video residual decoding method according to an embodiment of the present invention.

In accordance with the flow shown in FIG. 19, steps 1908 and 1910 are performed when the last sub-block of the transform block is decoded. Since the video residual decoding uses one transform block as a decoding unit, the video residual decoding is ended after steps 1908 and 1910 are redundantly performed in response to decoding of the last sub-block of the transform block. FIG. 20 is a flowchart illustrating a second alternative regular-mode video residual decoding method according to an embodiment of the present invention. Provided that the result is substantially the same, the steps are not required to be executed in the exact order shown in FIG. 20. The major difference between the flows shown in FIG. 19 and FIG. 20 is that step 1906 is followed by step 1912. In this way, the video residual decoding of one transform block is ended when it is determined that the last sub-block of the transform block is decoded. That is, when the current sub-block is the last sub-block of the transform block and decoding of the current sub-block is completed, the video residual decoding of one transform block is ended without redundant handling of the neighbor data.

Figure 21:
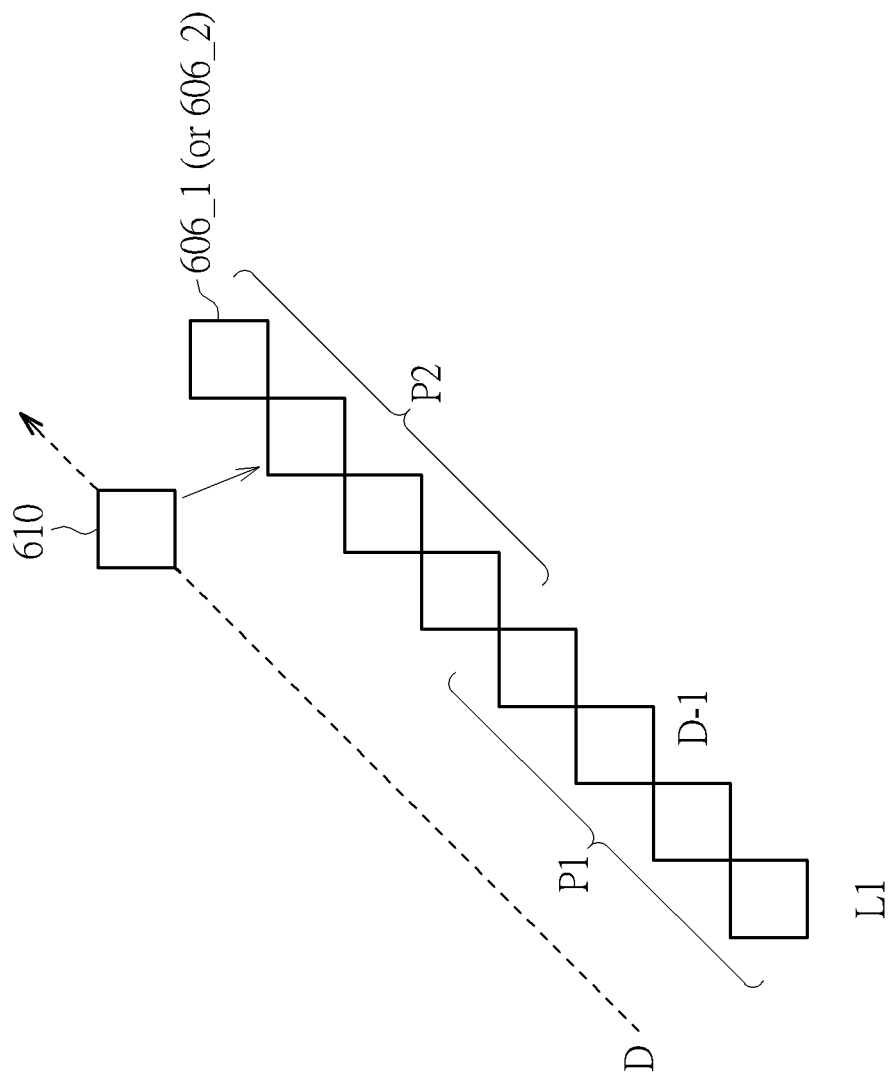
FIG. 21 is a diagram illustrating a fourth arrangement of the neighbor storage device 604 for residual decoding of one transform block mode according to an embodiment of the present invention.

In accordance with the second neighbor storage mechanism in video residual decoding, the video residual decoding apparatus 600 may perform residual decoding of one transform block in the TS mode by using one L1 diagonal neighbor buffer 606_1/606_2 and the current sub-block neighbor buffer 610, without the need of the L2 diagonal neighbor buffer 608. FIG. 21 is a diagram illustrating a fourth arrangement of the neighbor storage device 604 for residual decoding of one transform block mode according to an embodiment of the present invention. The major difference between arrangements of the neighbor storage device 604 in FIG. 18 and FIG. 21 is that the L2 diagonal neighbor buffer 608 is not needed in the TS mode. When the second neighbor storage mechanism is enabled for the TS-mode residual decoding, only one of the L1 diagonal neighbor buffers 606_1 and 606_2 is selected and used to serve as a shared buffer for buffering neighbor data belonging to sub-blocks located at a current diagonal line D and are referenced by the residual decoding of sub-blocks located at a next diagonal line (D+1), and for buffering neighbor data belonging to sub-blocks located at a previous diagonal line (D−1) and are referenced by the residual decoding of sub-blocks located at the current diagonal line D. According to the forward diagonal scan order, the residual decoding of the sub-blocks located at the current diagonal line D is followed by the residual decoding of the sub-blocks located at the next diagonal line (D+1), and the residual decoding of the sub-blocks located at the previous diagonal line (D−1) is followed by the residual decoding of the sub-blocks located at the current diagonal line D.

Since a single L1 diagonal neighbor buffer 606_1/606_2 is shared for buffering neighbor data belonging to sub-blocks located at adjacent diagonal lines (which include the current diagonal line D and the previous diagonal line (D−1)), data overwriting occurs during the residual decoding of the sub-blocks located at the current diagonal line D. For example, during the residual decoding of the sub-blocks located at the current diagonal line D, neighbor data that belong to a sub-block located at the previous diagonal line (D−1) are overwritten by neighbor data that belong to a sub-block located at the current diagonal line D. As shown in FIG. 21, the L1 diagonal neighbor buffer 606_1/606_2 may be regarded as having a current line part P1 and a previous line part P2 during the residual decoding of the sub-blocks located at the current diagonal line D, where the current line part P1 includes storage units that store neighbor data belonging to sub-blocks located at the current diagonal line D, and the previous line part P2 includes storage units that store neighbor data belonging to sub-blocks located at the previous diagonal line (D−1).

The current sub-block neighbor buffer 610 is arranged to buffer neighbor data that belong to a current sub-block located at the current diagonal line D during the residual decoding of the current sub-block. Consider a case where the residual decoding of the current sub-block indicates that the current sub-block has at least one non-zero coefficient. At an end of the residual decoding of the current sub-block, the neighbor data that belong to the current sub-block and are stored in the current sub-block neighbor buffer 610 are pushed into a storage area allocated in the L1 diagonal neighbor buffer 606_1/606_2. For example, the neighbor data that belong to the current sub-block and are stored in the current sub-block neighbor buffer 610 are pushed into one storage unit of the previous line part P2, such that this storage unit of the previous line part P2 is overwritten and then becomes one storage unit of the current line part P1. Hence, the neighbor data that belong to the current sub-block and stored in the L1 diagonal neighbor buffer 606_1/606_2 can be later referenced by the residual decoding of sub-blocks at the diagonal line (D+1).

Consider another case where the residual decoding of the current sub-block indicates that the current sub-block has all zero coefficients. A storage area allocated in the L1 diagonal neighbor buffer 606_1/606_2 for storing the neighbor data that belong to the current sub-block is cleared. For example, one storage unit of the previous line part P2 is cleared and then becomes one storage unit of the current line part P1. This is equivalent to pushing the neighbor data (which are zero coefficients) that belong to the current sub-block into the L1 diagonal neighbor buffer 606_1/606_2. Similarly, the neighbor data (which are zero coefficients) that belong to the current sub-block and stored in the L1 diagonal neighbor buffer 606_1 can be later referenced by the residual decoding of sub-blocks at the diagonal line (D+1).

Figure 22:
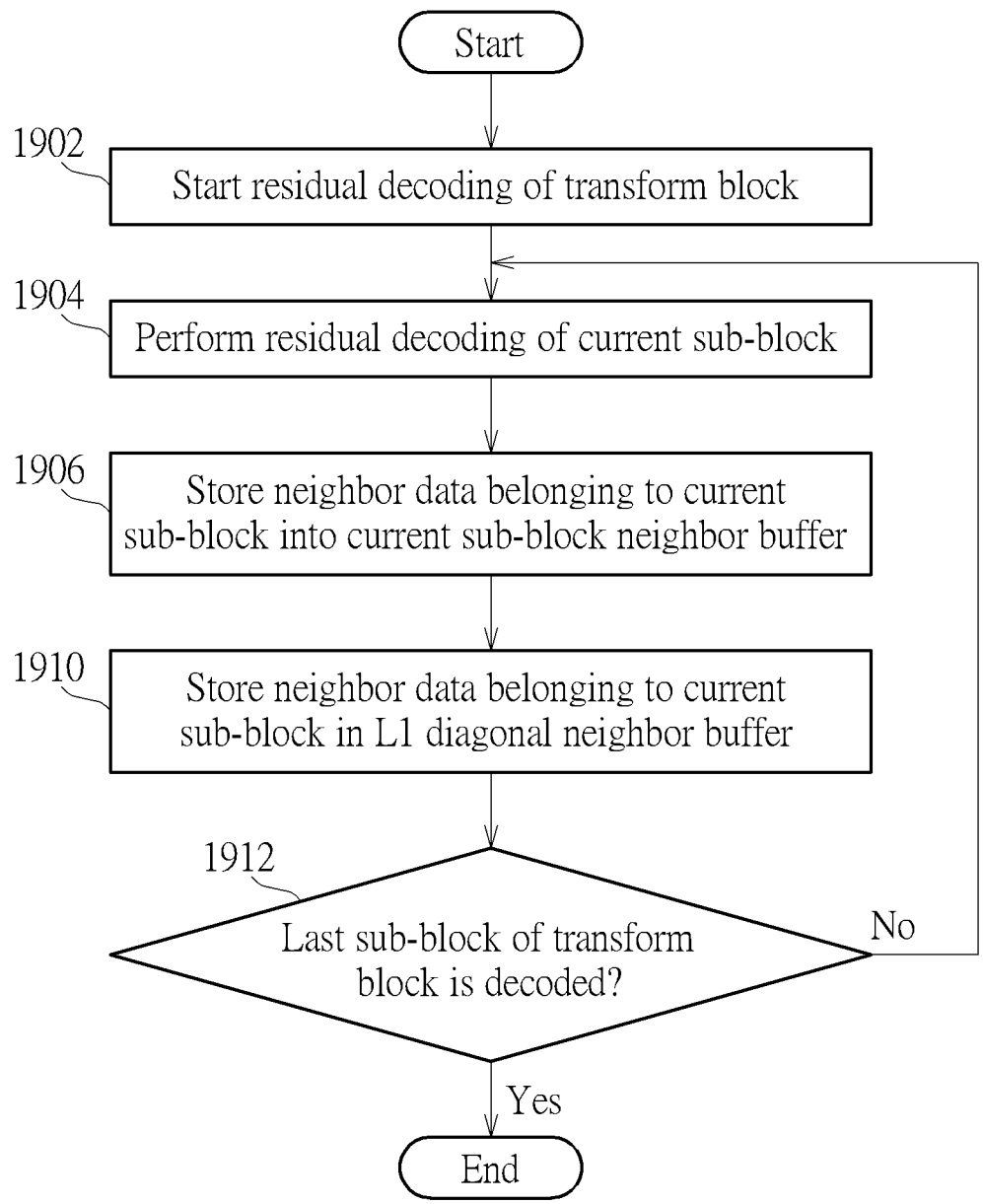
FIG. 22 is a flowchart illustrating a second TS-mode video residual decoding method according to an embodiment of the present invention.

FIG. 22 is a flowchart illustrating a second TS-mode video residual decoding method according to an embodiment of the present invention. Provided that the result is substantially the same, the steps are not required to be executed in the exact order shown in FIG. 22. The video residual decoding method may be employed by the video residual decoding apparatus 600 shown in FIG. 6. The major difference between the video residual decoding methods in FIG. 19 and FIG. 22 is that step 1908 is omitted from the video residual decoding method in FIG. 22. As a person skilled in the pertinent art can readily know details of the steps in FIG. 22 after reading above paragraphs directed to FIG. 19, further description is omitted here for brevity.

Figure 23:
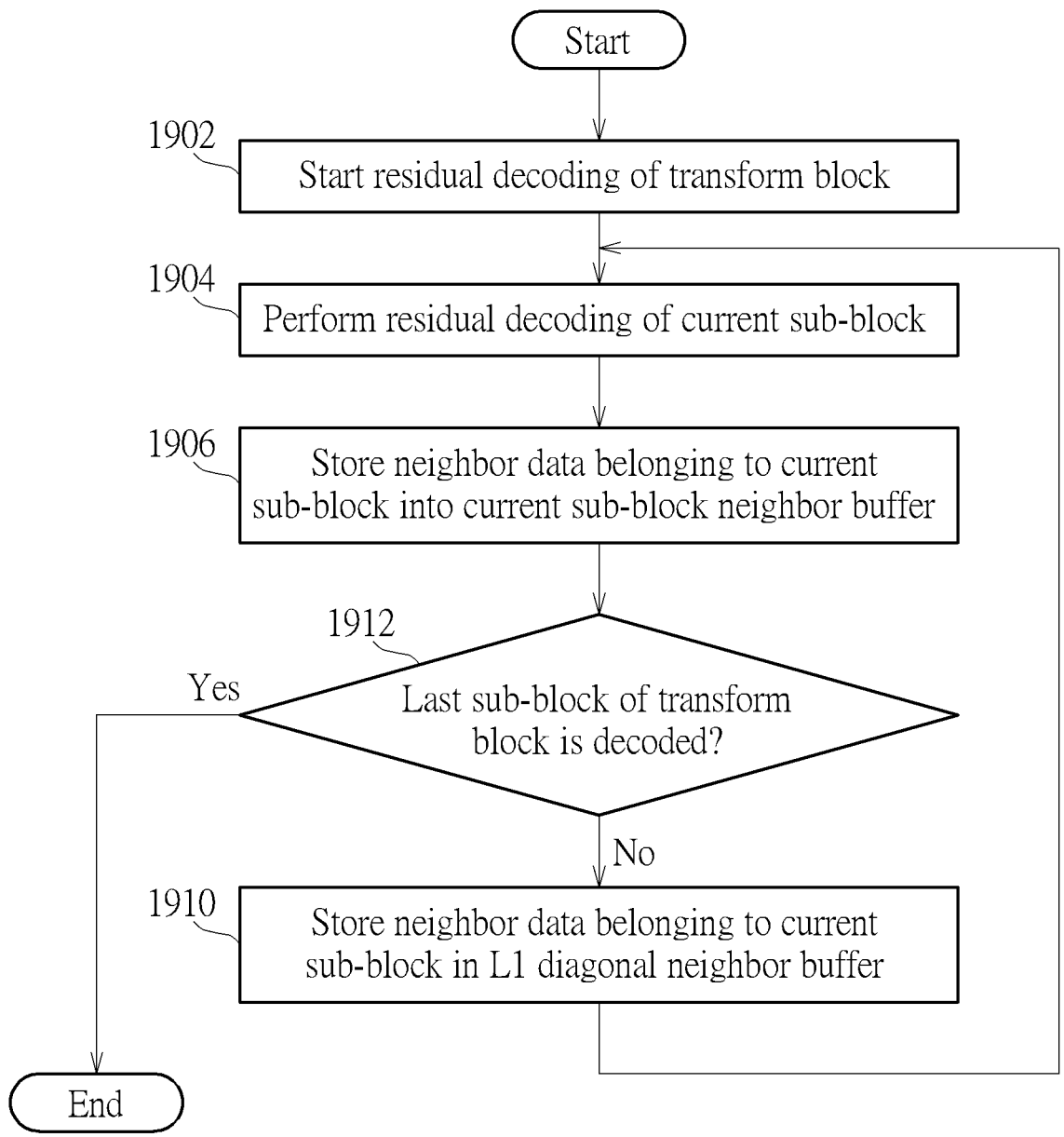
FIG. 23 is a flowchart illustrating a second alternative TS-mode video residual decoding method according to an embodiment of the present invention.

FIG. 23 is a flowchart illustrating a second alternative TS-mode video residual decoding method according to an embodiment of the present invention. Provided that the result is substantially the same, the steps are not required to be executed in the exact order shown in FIG. 23. The video residual decoding method may be employed by the video residual decoding apparatus 600 shown in FIG. 6. The major difference between the video residual decoding methods in FIG. 20 and FIG. 23 is that step 1908 is omitted from the video residual decoding method in FIG. 23. As a person skilled in the pertinent art can readily know details of the steps in FIG. 23 after reading above paragraphs directed to FIG. 20, further description is omitted here for brevity.

Figure 24:
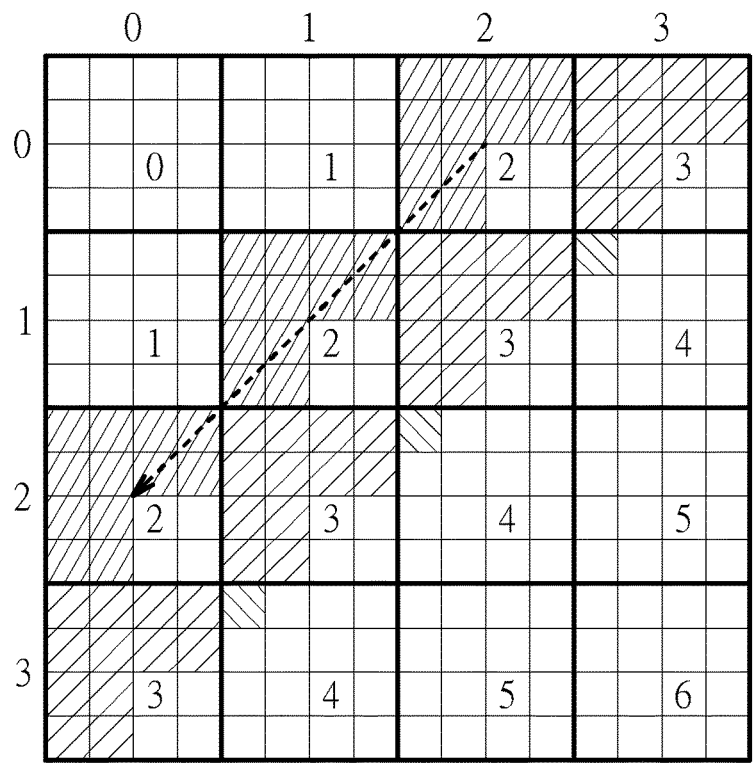
FIG. 24 is a diagram illustrating a first design embodiment of the present invention.

For better comprehension of technical features of the present invention, several examples are provided. FIG. 24 is a diagram illustrating a first design embodiment of the present invention. Suppose that the TB size is 16×16, the SB size is 4×4, and the current decoding diagonal line is D=2. When the first neighbor storage mechanism is enabled for regular-mode video residual decoding of one transform block, one L1 diagonal neighbor buffer may store neighboring data belonging to sub-blocks at the current decoding diagonal line D=2 (which are indicated by the slanted areas within the sub-blocks at the current decoding diagonal line D=2), the other L1 diagonal neighbor buffer may store neighboring data belonging to sub-blocks at the previous decoded diagonal line D+1=3 (which are indicated by the slanted areas within the sub-blocks at the previous diagonal line D+1=3), and the L2 diagonal neighbor buffer may store neighboring data belonging to sub-blocks at the previous decoded diagonal line D+2=4 (which are indicated by the slanted areas within the sub-blocks at the previous diagonal line D+2=4).

When the second neighbor storage mechanism is enabled for regular-mode video residual decoding of one transform block, one L1 diagonal neighbor buffer is shared for storing neighboring data belonging to sub-blocks at the current decoding diagonal line D=2 (which are indicated by the slanted areas within the sub-blocks at the current decoding diagonal line D=2), and for storing neighboring data belonging to sub-blocks at the previous decoded diagonal line D+1=3 (which are indicated by the slanted areas within the sub-blocks at the previous decoded diagonal line D+1=3). In addition, the L2 diagonal neighbor buffer may store neighboring data belonging to sub-blocks at the previous decoded diagonal line D+2=4 (which are indicated by the slanted areas within the sub-blocks at the previous diagonal line D+2=4).

Figure 25:
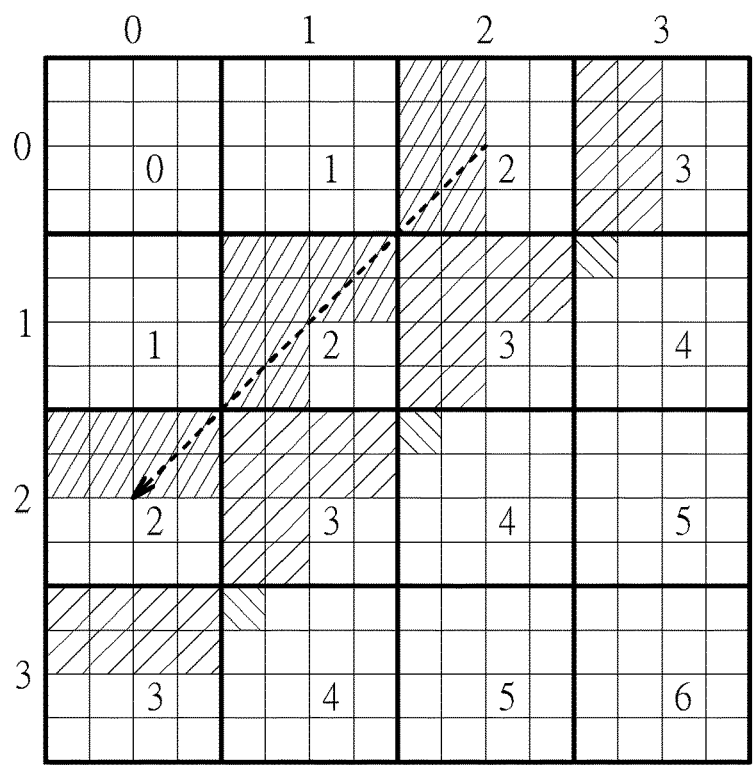
FIG. 25 is a diagram illustrating a second design embodiment of the present invention.

As mentioned above, the number of storage units allocated in the L1 diagonal neighbor buffer for storing required neighbor data belonging to a head sub-block and/or a tail sub-block at one diagonal line may be reduced for hardware cost reduction. FIG. 25 is a diagram illustrating a second design embodiment of the present invention. Compared to the first design embodiment, the second design embodiment can have relaxed buffer requirement.

Figure 26:
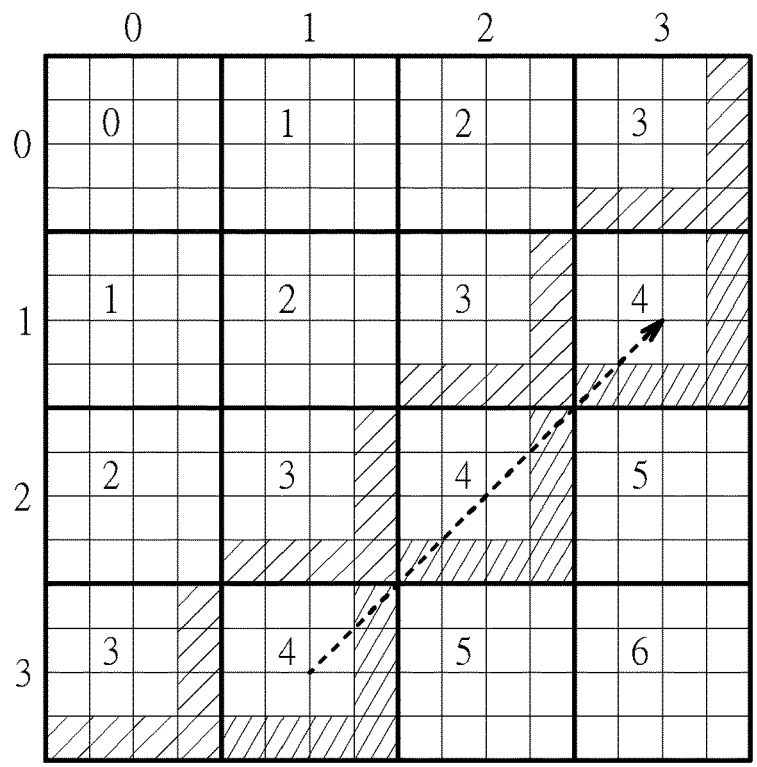
FIG. 26 is a diagram illustrating a third design embodiment of the present invention.

FIG. 26 is a diagram illustrating a third design embodiment of the present invention. Suppose that the TB size is 16×16, the SB size is 4×4, and the current decoding diagonal line is D=4. When the first neighbor storage mechanism is enabled for TS-mode video residual decoding of one transform block, one L1 diagonal neighbor buffer may store neighboring data belonging to sub-blocks at the current decoding diagonal line D=4 (which are indicated by the slanted areas within the sub-blocks at the current decoding diagonal line D=4), and the other L1 diagonal neighbor buffer may store neighboring data belonging to sub-blocks at the previous decoded diagonal line D−1=3 (which are indicated by the slanted areas within the sub-blocks at the previous decoded diagonal line D−1=3).

When the second neighbor storage mechanism is enabled for TS-mode video residual decoding of one transform block, one L1 diagonal neighbor buffer is shared for storing neighboring data belonging to sub-blocks at the current decoding diagonal line D=4 (which are indicated by the slanted areas within the sub-blocks at the current decoding diagonal line D=4), and for storing neighboring data belonging to sub-blocks at the previous decoded diagonal line D−1=3 (which are indicated by the slanted areas within the sub-blocks at the previous decoded diagonal line D−1=3).

Figure 27:
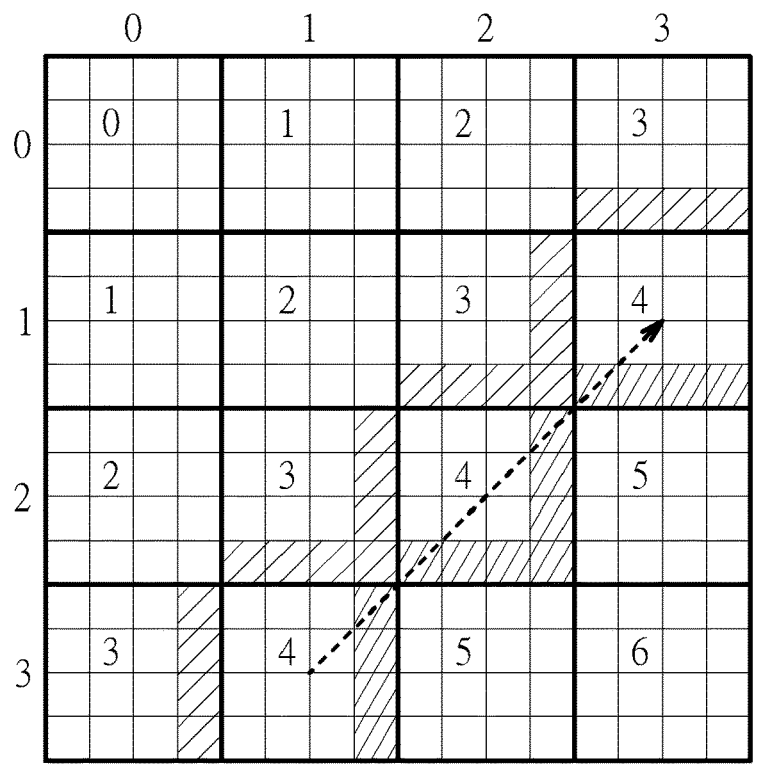
FIG. 27 is a diagram illustrating a fourth design embodiment of the present invention.

As mentioned above, the number of storage units allocated in the L1 diagonal neighbor buffer for storing required neighbor data belonging to a head sub-block and/or a tail sub-block at one diagonal line may be reduced for hardware cost reduction. FIG. 27 is a diagram illustrating a fourth design embodiment of the present invention. Compared to the third design embodiment, the fourth design embodiment can have relaxed buffer requirement.

Figure 28:
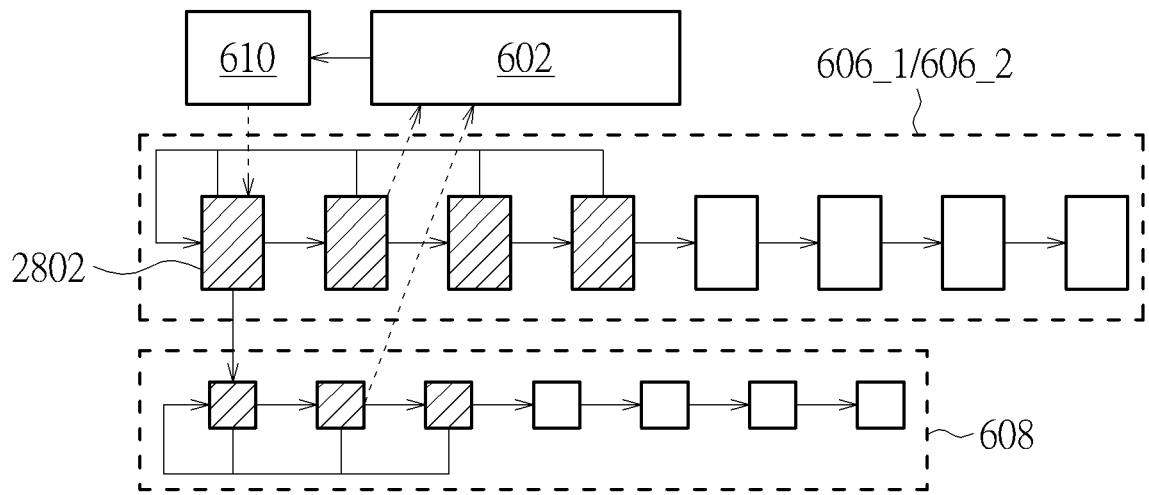
FIG. 28 is a diagram illustrating one implementation of the neighbor storage device shown in FIG. 6 according to an embodiment of the present invention.

In one exemplary buffer design, a diagonal neighbor buffer may be implemented by a plurality of shift registers. FIG. 28 is a diagram illustrating one implementation of the neighbor storage device 604 shown in FIG. 6 according to an embodiment of the present invention. Each of the L1 diagonal neighbor buffer 606_1/606_2 and the L2 diagonal neighbor buffer 608 may be implemented using shift registers 2802 that are controlled by the residual decoding circuit 602. However, this is for illustrative purposes only, and is not meant to be a limitation of the present invention.

Figure 29:
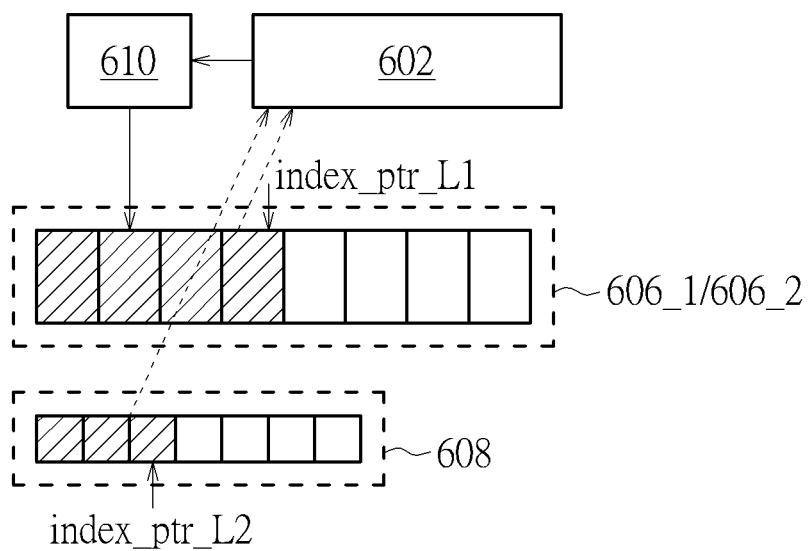
FIG. 29 is a diagram illustrating another implementation of the neighbor storage device shown in FIG. 6 according to an embodiment of the present invention.

In another exemplary buffer design, a diagonal neighbor buffer may be implemented by an index pointer and a plurality of units. FIG. 29 is a diagram illustrating another implementation of the neighbor storage device 604 shown in FIG. 6 according to an embodiment of the present invention. Each of the L1 diagonal neighbor buffer 606_1/606_2 and the L2 diagonal neighbor buffer 608 may have a storage space divided into a plurality of units. The residual decoding circuit 602 may set an index pointer index_ptr_L1 to control access of the L1 diagonal neighbor buffer 606_1/606_2, and may set an index pointer index_ptr_L2 to control access of the L2 diagonal neighbor buffer 608. For example, the residual decoding circuit 602 sets the index pointer index_ptr_L1 to label which unit in the L1 diagonal neighbor buffer 606_1/606_2 will be selected for updating its stored data. For another example, the residual decoding circuit 602 sets the index pointer index_ptr_L2 to label which unit in the L2 diagonal neighbor buffer 608 will be selected for updating its stored data. However, this is for illustrative purposes only, and is not meant to be a limitation of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video residual decoding apparatus comprising:
   a residual decoding circuit, arranged to apply residual decoding to a transform block, wherein the transform block is divided into M sub-blocks, M is a positive integer, and the M sub-blocks are processed by the residual decoding in a diagonal scan order; and
   a neighbor storage device, arranged to store neighbor data that belong to neighboring sub-blocks and are referenced by the residual decoding of a current sub-block, wherein neighbor data belonging to a sub-block is derived from a residual decoding result of the sub-block, and a storage size of the neighbor storage device is not larger than a maximum data amount of neighbor data derived from residual decoding results of N sub-blocks, where N is a positive integer, and N is smaller than M.

2. The video residual decoding apparatus of claim 1, wherein the neighbor storage device comprises:
   a first diagonal neighbor buffer, arranged to buffer neighbor data that belong to sub-blocks located at a current diagonal line and are referenced by the residual decoding of sub-blocks located at a next diagonal line, wherein according to the diagonal scan order, the residual decoding of the sub-blocks located at the current diagonal line is followed by the residual decoding of the sub-blocks located at the next diagonal line; and
   a second diagonal neighbor buffer, arranged to buffer neighbor data that belong to sub-blocks located at one previous diagonal line and are referenced by the residual decoding of the sub-blocks located at the current diagonal line, wherein according to the diagonal scan order, the residual decoding of the sub-blocks located at said one previous diagonal line is followed by the residual decoding of the sub-blocks located at the current diagonal line.

3. The video residual decoding apparatus of claim 2, wherein a buffer size of the first diagonal neighbor buffer is equal to a data amount of neighbor data that belong to only a portion of coefficients in sub-blocks located at a diagonal line with a maximum length in the transform block.

4. The video residual decoding apparatus of claim 2, wherein a buffer size of the second diagonal neighbor buffer is equal to a data amount of neighbor data that belong to only a portion of coefficients in sub-blocks located at a diagonal line with a maximum length in the transform block.

5. The video residual decoding apparatus of claim 2, wherein at an end of the residual decoding of the sub-blocks located at the current diagonal line, the second diagonal neighbor buffer is arranged to start buffering neighbor data that belong to the sub-blocks located at the next diagonal line.

6. The video residual decoding apparatus of claim 2, wherein the neighbor storage device further comprises:
   a third diagonal neighbor buffer, arranged to buffer neighbor data that belong to sub-blocks located at another previous diagonal line and are referenced by the residual decoding of the sub-blocks located at the current diagonal line, wherein according to the diagonal scan order, the residual decoding of the sub-blocks located at said another previous diagonal line is followed by the residual decoding of the sub-blocks located at said one previous diagonal line.

7. The video residual decoding apparatus of claim 6, wherein a buffer size of the third diagonal neighbor buffer is equal to a data amount of neighbor data that belong to only a portion of coefficients in sub-blocks located at a diagonal line with a second maximum length in the transform block.

8. The video residual decoding apparatus of claim 6, wherein at an end of the residual decoding of the sub-blocks located at the current diagonal line, partial data stored in the second diagonal neighbor buffer are pushed into the third diagonal neighbor buffer.

9. The video residual decoding apparatus of claim 2, wherein the neighbor storage device further comprises:
   a current sub-block neighbor buffer, arranged to buffer neighbor data that belong to a current sub-block located at the current diagonal line during the residual decoding of the current sub-block.

10. The video residual decoding apparatus of claim 9, wherein the residual decoding of the current sub-block indicates that the current sub-block has at least one non-zero coefficient, and at an end of the residual decoding of the current sub-block, the neighbor data that belong to the current sub-block and are stored in the current sub-block neighbor buffer are pushed into the first diagonal neighbor buffer.

11. The video residual decoding apparatus of claim 9, wherein the residual decoding of the current sub-block indicates that the current sub-block has all zero coefficients, and a storage area allocated in the first diagonal neighbor buffer for storing the neighbor data that belong to the current sub-block is cleared.

12. The video residual decoding apparatus of claim 1, wherein the neighbor storage device comprises:
   a first diagonal neighbor buffer, arranged to serve as a shared buffer for buffering neighbor data that belong to sub-blocks located at a current diagonal line and are referenced by the residual decoding of sub-blocks located at a next diagonal line and for buffering neighbor data that belong to sub-blocks located at one previous diagonal line and are referenced by the residual decoding of the sub-blocks located at the current diagonal line;
   wherein according to the diagonal scan order, the residual decoding of the sub-blocks located at said one previous diagonal line is followed by the residual decoding of the sub-blocks located at the current diagonal line, and the residual decoding of the sub-blocks located at the current diagonal line is followed by the residual decoding of the sub-blocks located at the next diagonal line;
   wherein during the residual decoding of the sub-blocks located at the current diagonal line, neighbor data that belong to a first sub-block located at said one previous diagonal line are overwritten by neighbor data that belong to a second sub-block located at the current diagonal line.

13. The video residual decoding apparatus of claim 12, wherein the neighbor storage device further comprises:
   a second diagonal neighbor buffer, arranged to buffer neighbor data that belong to sub-blocks located at another previous diagonal line and are referenced by the residual decoding of the sub-blocks located at the current diagonal line, wherein according to the diagonal scan order, the residual decoding of the sub-blocks located at said another previous diagonal line is followed by the residual decoding of the sub-blocks at said one previous diagonal line.

14. The video residual decoding apparatus of claim 13, wherein before the neighbor data that belong to the first sub-block located at said one previous diagonal line are overwritten by the neighbor data that belong to the second sub-block located at the current diagonal line, partial data of the first sub-block located at said one previous diagonal line are pushed into the second diagonal neighbor buffer.

15. The video residual decoding apparatus of claim 12, wherein the neighbor storage device further comprises:
a current sub-block neighbor buffer, arranged to buffer neighbor data that belong to a current sub-block located at the current diagonal line during the residual decoding of the current sub-block.

16. The video residual decoding apparatus of claim 15, wherein the residual decoding of the current sub-block indicates that the current sub-block has at least one non-zero coefficient, and at an end of the residual decoding of the current sub-block, the neighbor data that belong to the current sub-block and are stored in the current sub-block neighbor buffer are pushed into the first diagonal neighbor buffer.

17. The video residual decoding apparatus of claim 15, wherein the residual decoding of the current sub-block indicates that the current sub-block has all zero coefficients, and a storage area allocated in the first diagonal neighbor buffer for storing the neighbor data that belong to the current sub-block is cleared.

18. The video residual decoding apparatus of claim 1, wherein the diagonal scan order is from a right-bottom sub-block of the transform block to a left-top sub-block of the transform block.

19. The video residual decoding apparatus of claim 1, wherein the diagonal scan order is from a left-top sub-block of the transform block to a right-bottom sub-block of the transform block.

20. A video residual decoding method comprising:
applying residual decoding to a transform block, wherein the transform block is divided into M sub-blocks, M is a positive integer, and the M sub-blocks are processed by the residual decoding in a diagonal scan order; and
storing, by a neighbor storage device, neighbor data that belong to neighboring sub-blocks and are referenced by the residual decoding of a current sub-block, wherein neighbor data belonging to a sub-block is derived from a residual decoding result of the sub-block, and a storage size of the neighbor storage device is not larger than a maximum data amount of neighbor data derived from residual decoding results of N sub-blocks, where N is a positive integer, and N is smaller than M.

* * * * *